(12) United States Patent
Gupta et al.

(10) Patent No.: US 11,874,893 B2
(45) Date of Patent: Jan. 16, 2024

(54) MODULARIZING AND EMBEDDING SUPPLEMENTAL TEXTUAL AND VISUAL CONTENT IN DIFFERENT ENVIRONMENTS

(71) Applicant: Microsoft Technology Licensing, LLC, Redmond, WA (US)

(72) Inventors: Amit Gupta, Hyderabad (IN); Neeraj Sharma, Hyderabad (IN); Prashant Raj Bhugra, Hyderabad (IN); Sumit Chatterjee, Hyderabad (IN); Avishek Mazumder, Hyderabad (IN); Vivek Jain, Hyderabad (IN); Shilpa Gopinathan Nair, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/684,426

(22) Filed: Nov. 14, 2019

(65) Prior Publication Data
US 2021/0149973 A1    May 20, 2021

(51) Int. Cl.
*G06F 16/958*   (2019.01)
*G06F 9/451*    (2018.01)
(Continued)

(52) U.S. Cl.
CPC ............ *G06F 16/958* (2019.01); *G06F 9/451* (2018.02); *G06F 16/9538* (2019.01); *G06F 16/9577* (2019.01)

(58) Field of Classification Search
None
See application file for complete search history.

(56) References Cited

U.S. PATENT DOCUMENTS

2012/0136922 A1* 5/2012 Falkenberg ........... G06F 16/958
709/203
2014/0019847 A1* 1/2014 Osmak .................. G06F 40/174
715/234
(Continued)

FOREIGN PATENT DOCUMENTS

WO   2010008230 A2   1/2010

OTHER PUBLICATIONS

Takagi, Hironobu, Shinya Kawanaka, Masatomo Kobayashi, Takashi Itoh, and Chieko Asakawa. "Social accessibility: achieving accessibility through collaborative metadata authoring." In Proceedings of the 10th international ACM SIGACCESS conference on Computers and accessibility, pp. 193-200. 2008. (Year: 2008).*

(Continued)

*Primary Examiner* — Frank D Mills

(57) ABSTRACT

Aspects of the present disclosure relate to modularizing and embedding modules across a variety of web applications. More specifically, the present disclosure provides an adaptive UI module to web application servers that adapts its format upon evaluating an environment of the web application and receiving a user request for supplemental information. For example, a single adaptive UI module may be used across a variety of web applications, with a variety of requests for supplemental content from within each web application, to generate multiple, unique formatted UI modules. In this way, a single adaptive UI module may generate formatted UI modules specific to the formatting requirements of each requesting web application, with supplemental content related to each unique user request from within each web application.

20 Claims, 15 Drawing Sheets

(51) Int. Cl.
    *G06F 16/957*     (2019.01)
    *G06F 16/9538*     (2019.01)

(56) References Cited

U.S. PATENT DOCUMENTS

| | | | |
|---|---|---|---|
| 2014/0325374 A1 | 10/2014 | Dabrowski et al. | |
| 2014/0344670 A1* | 11/2014 | Cathey | G06F 16/9535 |
| | | | 715/234 |
| 2015/0154660 A1* | 6/2015 | Weald | G06Q 30/0277 |
| | | | 705/14.73 |
| 2016/0209994 A1* | 7/2016 | Kaufthal | G06F 8/38 |
| 2018/0081866 A1* | 3/2018 | DiTomaso | G06F 40/117 |
| 2018/0285953 A1* | 10/2018 | Mysen | G06Q 30/0641 |
| 2020/0034397 A1* | 1/2020 | Sumbaly | G06F 16/955 |

OTHER PUBLICATIONS

"International Search Report and Written Opinion Issued in PCT Application No. PCT/US20/057276", dated Feb. 8, 2021, 12 Pages.

\* cited by examiner

MODULARIZING AND EMBEDDING SUPPLEMENTAL TEXTUAL AND VISUAL CONTENT IN DIFFERENT ENVIRONMENTS

TECHNICAL FIELD

The present disclosure relates to selectively and adaptively incorporating relevant textual and visual information on different surfaces (e.g., client environments) within web applications, methods and systems.

BACKGROUND

Various web applications have information that would benefit from supplemental content. Often, users or developers of the web application recognize a need for this supplemental content, however, methods and services of displaying the supplemental content involve navigating and loading multiple webpages. Requiring users of web applications to navigate between multiple windows to retrieve content necessary for an informed decision, is not very efficient. Further, requiring users to leave a web application to get the desired supplemental content directs users away from such web application and risks the chance that they will not return.

Moreover, web applications that may display supplemental content within their application (e.g., an "all-in-one" experience), require individualized development to display the all-in-one experience on each unique web application, accounting for application-specific formatting and content. This creates a large burden on web application developers to generate a different experience for each unique web application. Otherwise, all-in-one experiences are presented in manners that misalign with the look and feel of various web applications, and may not properly function as a part of a single web application. Additionally, display of supplemental content may be unique for each user selection within a single web application. Identical display of different supplemental content may not be effective for user understanding of the content, and would better be processed if the content was displayed in different layers or in different formats in the web application. These problems cause user confusion and frustration, developer inefficiency, and renders the all-in-one experience ineffective.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to selectively and adaptively incorporating relevant textual and visual information on different surfaces (e.g., client environments) within uniquely formatted web applications. Specifically, the present disclosure teaches systems and methods for generating and embedding format-specific modules in format-unique web applications on a user interface (UI) using an adaptive UI module.

Adaptive UI module systems may have a plurality of configurations, including a plurality of client devices, retailer servers, web applications, formatted UI modules, and a module server, all connected over a network. In an embodiment, a client device may request or select supplemental content from a web application on the client device. Upon receiving the request, the module server may send an adaptive UI module to the application server (which provides the web application content to the client device) for embedding in the web application. The adaptive UI module has an underlying data layer that is easily restructured, reformatted, selectively utilized, or otherwise malleable.

For example, the underlying data layer may be malleable in selected content or in format of the selected content. The underlying content may be malleable via software capable of determining search results for a query, selecting a subset of the query results, regrouping search results into one or more groupings, including retailers, products, categories, or any other grouping of the search results based on similar features of the search results. A user feedback mechanism may be implemented to determine which subset of query results should be displayed. For example, when a user makes a request for supplemental content, a subset of search results are displayed based on the user's request (e.g., what the user indicated an interest in). User feedback may be collected for subsequent user selections within the displayed supplemental content. For example, the supplemental content may be updated if a user selects a UI component representing a portion of the supplemental content. Additionally or alternatively, a user selection of a UI element representing a portion of the supplemental content may be used to logically select supplemental content for future user search queries. Thus, the supplemental content displayed to the user may be updated dynamically or statically over time.

Additionally or alternatively, the format may be malleable by storing the content (as generated by the module information in the adaptive UI module) in a simple and easily accessible form, capable of being optimized for different surfaces based on various criteria. For example, the content may be stored in a simplified manner, like transforming the module information into an equivalent JavaScript™ Object Notation (JSON) string, or other simplified or string organization to allow for ease of implementation across various types of web applications. The simplified storing of content may then be restructured based on various criteria, including space/dimensions, surrounding content/context, latency requirements, freshness of data, fonts, cannibalization of other UI features, or other requirements.

Once the adaptive UI module is sent to the application server, the adaptive UI module may evaluate an environment of the web application, including detecting some of the various criteria listed above. Based on the evaluated environment of the web application, the adaptive UI module may determine a format and generate a formatted UI module based on the determined format and logically select supplemental content based on a user query. The formatted UI module may then be displayed in the web application at the client device. This process may be repeated to generate and display a plurality of unique formatted UI modules across a variety of web applications, having a variety of formats and unique types of supplemental content.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying figures illustrate one or more aspects of the disclosed methods and systems for modularizing and embedding supplemental content and, together with the detailed description, serve to explain the aspects and implementations of modularizing and embedding supplemental content. In the appended figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label. Non-limiting and non-exhaustive examples are described with reference to the following figures.

Figure 1:
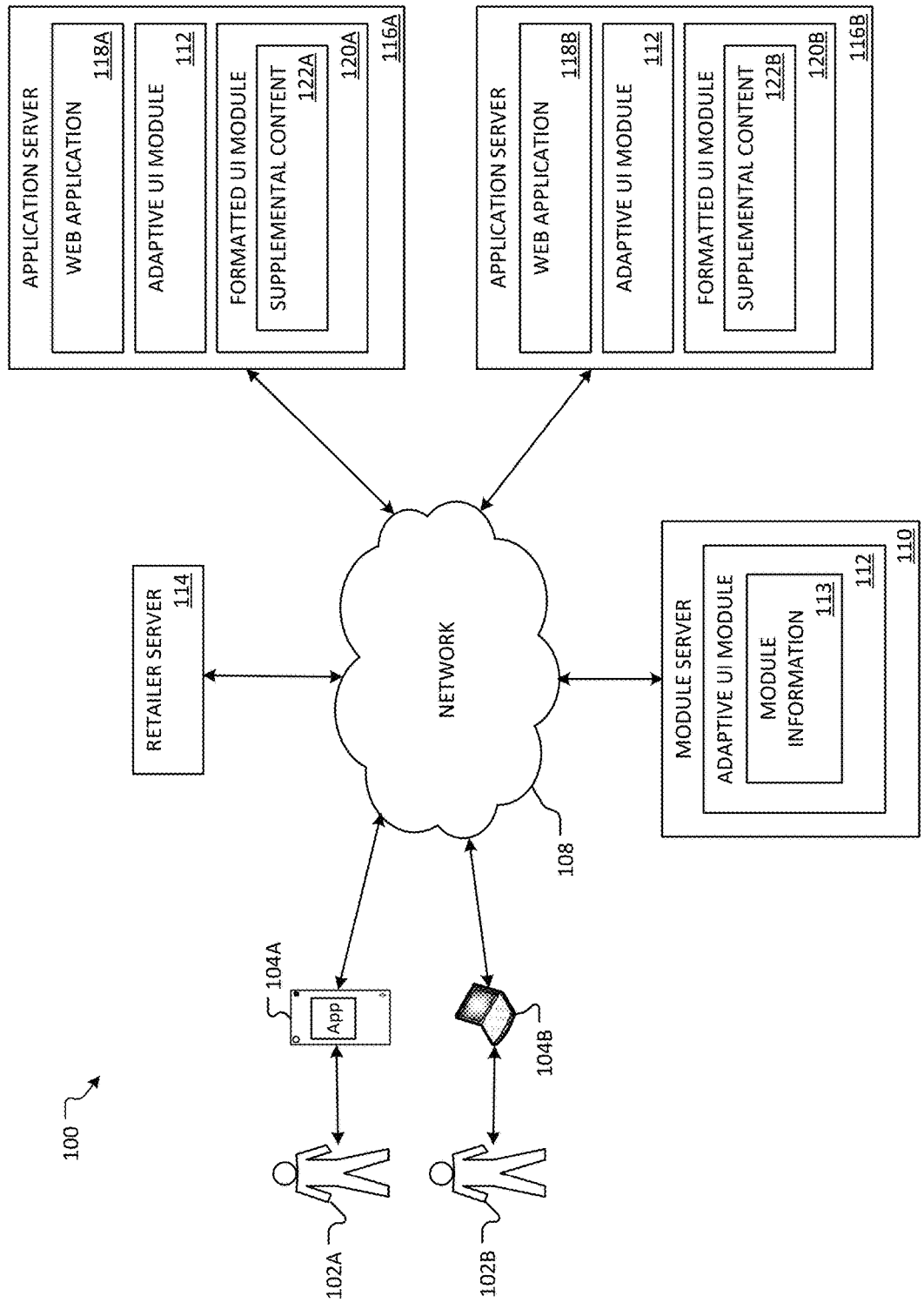
FIG. 1 illustrates an overview of an example system for modularizing and embedding supplemental content.

While embodiments of the disclosure are amenable to various modifications and alternative forms, specific embodiments have been shown by way of example in the drawings and are described in detail below. The intention is not to limit the scope of the disclosure to the particular embodiments described. On the contrary, the disclosure is intended to cover all modifications, equivalents, and alternatives falling within the scope of the disclosure and the appended claims.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entire software implementation, or an implementation combining software and hardware aspects. The following detailed description is, therefore, not to be interpreted in a limiting sense.

Accordingly, the present disclosure provides systems and methods for modularizing and embedding supplemental content (e.g., shopping content) across various web applications. In an example, the present disclosure aims to teach an adaptive UI module that may be embedded on various web applications to display a variety of supplemental content. The supplemental content (e.g., expert reviews, reviews, similar products, images, explore by, buying options, shop, videos, goes well with, filters, related content, suggested content, etc.) may be derived from module information in the adaptive UI module. Module information may be code that has been developed with specific functionality, such as collecting relevant content about supplemental content from various sources. Thus, modularizing and embedding the module information that is adaptable into unique supplemental content with a unique format may provide an instant experience to satisfy secondary and tertiary user intent within a single web application and across multiple web applications without requiring the user to leave the web application.

As an example, a user browsing an article on a webpage that wishes to shop for something mentioned in the article may be shown buying options in the context of the webpage, without having to leave the webpage, through an embedded adaptive UI module displaying the supplemental content. The adaptive UI module may be displayed in a variety of ways, including embedding within the webpage or through an overlay. This solution promotes user and web application efficiency in shopping experiences through the use of embedded, adaptive UI modules.

Additionally, the present disclosure also solves inefficiencies associated with developers needing to uniquely cater each shopping experience to each type of web application format. Past solutions require developers to independently build a limited shopping experience from scratch for each web application to promote synchronous and cohesive formatting and content. By providing and embedding an adaptive UI module in unique application servers hosting different web applications, the present solution promotes consistent and cohesive user experiences while also eliminating developer efforts required to build the shopping experience from scratch for each web application type.

Thus, this solution drastically improves web developer efficiency and resources. To clarify, web developers currently have to develop software based on a unique desired functionality and then after the functionality has been achieved, change the software to allow integration into specific web applications. Although the functionality may work on specific web applications, the software may not display in a way that mimics the specific format of each web application. This requires an additional step by developers that the present solution is eliminating. Therefore, the web developers now need to take steps to develop only a functionality of the software. This functionality may then be placed in an adaptive UI module in the form of module information that may be adapted to display unique content and formats of the developed functionality, specific to each web application.

One example of developed functionality that may be placed into an adaptive UI module as module information (e.g., code that has been developed with specific functionality) is supplemental content to be displayed in a web application upon a user's request, from within the web application, for more content. As an example, supplemental content may be a variety of content associated with information already displayed in a web application, such as shopping content (such as expert reviews, reviews, similar products, images, explore by, buying options, shop, videos, goes well with, and filters), related content, suggested content, or any other content or combination of content that may be displayed in association with a user selection from within a web application. The supplemental content may be displayed in form of images, audio, video, text, or any other form of information exchange. The supplemental content may be stored in the adaptive UI module as an underlying data layer that is easily restructured, reformatted, selectively utilized, or otherwise malleable.

For example, the underlying data layer may allow efficient display or formatting of supplemental content because the adaptive UI module may be stored by the server hosting the web application. Thus, the functionality stored as module information (e.g., code that has been developed with specific functionality) in a simple, malleable manner on the adaptive UI module allows for selection of supplemental content (e.g., expert reviews, reviews, similar products, images, explore by, buying options, shop, videos, goes well with, filters, related content, suggested content, etc.) and formatting that is specific to both the web application generally, and each user selection for supplemental content from within the web application. For example, within a web application, a user may make a selection for supplemental content about a sports team, and subsequently indicate a request for supplemental content about a dress product. In this example, the single adaptive UI module stored on the server of the web application may use the functionality contained in the module information to display sports team supplemental content, such as past team history for the sports team, in a list or timeline format, while displaying dress supplemental content, such as related product and retailer information, for the indication of the dress product in a tabbed or block format.

The adaptive UI module may also learn from user feedback. For example, if every time there is a user selection (e.g., request for more information) of a sports team the user then selects purchase information about tickets related to that sports team, the adaptive UI module may show additional or different supplemental content related to tickets in association with a user selection of a sports team. This may also be accomplished by updating supplemental content based on a user selection from within the currently displayed supplemental content. Thus, the present solution may utilize user feedback mechanisms to further improve adaptability. In this way, the adaptive UI module may vary both the content and format of the indicated supplemental content for unique user selections. This further promotes content sharing efficiency by providing a module that is adaptable per web application as well as adaptable per each user selection within a web application.

To allow for this efficiency, the underlying functional software or data layer contained in the adaptive UI module may be stored in a way that is readily accessible and malleable across a variety of web applications. For example, the underlying functional software (i.e., the module information) may be stored in a simplified manner, like transforming the content into an equivalent JavaScript™ Object Notation (JSON) string, or other simplified or string organization to allow for ease of implementation across various types of web applications. The simplified storing of content may then be restructured based on various criteria, including space/dimensions, surrounding content/context, latency requirements, freshness of data, fonts, cannibalization of other UI features, or other requirements. By simplifying the functionality in the module information, and associated supplemental content, the adaptive UI module may intelligently display unique supplemental content and adapt the format of the module to display on a UI, based on various formatting aspects of the web application.

For example, the adaptive UI module may account for space/dimensions, surrounding content/context, latency requirements, freshness of data, fonts, cannibalization of other UI features, or other requirements. As another example, the adaptive UI module may display only the top four trending categories on lifestyle, rather than anything more or any categorically diverse trends. This may accommodate a small amount of available space in a web application that has similar content to lifestyle and promote synergy of common components. As another example, the adaptive UI module may accommodate business preferences or requirements to optimize transfers to specific web applications. In this example, the adaptive UI module may limit shopping experiences displayed to those that originate from the specified web application, to promote transfers of users to the specified page.

The adaptive UI module may also optimize the supplemental content for monetization. For example, an adaptive UI module may have an underlying data layer of the module information that is pre-optimized for monetization. Apart from ensuring the most relevant supplemental content is displayed, the layer may also allow a feedback process for click prediction algorithms to target monetizable supplemental content irrespective of the surface they are shown. Additionally or alternatively, the supplemental content obtained from the module information may be associated with a specific server location. For example, a certain portion (or specified minimum percentage) of the supplemental content displayed may be linked to a particular server. As a further example, a certain portion of the supplemental content shown would, if selected, reroute a user to the selected server (e.g., Microsoft Bing™)

As used herein, a computing device may be any of a variety of devices, including, but not limited to, a mobile computing device, a tablet computing device, a desktop or laptop computing device, an Internet of Things (IoT) computing device, a server computing device, or a distributed computing device (e.g., which may be comprised of a plurality of computing devices). An API provided by or made available by the computing device may enable a set of software instructions to engage in file system access or searching, network communication, process management, memory management, or communication with a specific hardware component (e.g., device drivers, sensor data access, etc.), among other functionalities. While the term API is used, it will be appreciated than an API may comprise any of a wide variety of software interfaces, commands, libraries, or services, among others, useable by a set of software instructions when executed by a computing device.

As used herein, "software," "software instructions," and a "set of software instructions" may be used interchangeably. Example software may include applications, plugins, scripts, modules, drivers, and/or web applications, among other examples. In some examples, software may be pre-compiled, compiled at runtime, or interpreted at runtime. In another example, software may execute in kernel mode, user mode, or a combination thereof.

While modules are described herein to assemble, generate, store, and/or display supplemental content to add to or expand what is previously available within a web application, it should be appreciated that the functionality adapted within the adaptive UI module and stored as module information may relate to any other type of information, adding content, modifying content, or deleting content.

With these broad concepts in mind, several examples of embedding adaptive UI modules across multiple web applications are discussed below.

For example, FIG. 1 illustrates an overview of an example system 100 for modularizing and embedding relevant textual and visual content, such as supplemental content 122A, 122B, across multiple application servers 116A, 116B. As illustrated, system 100 includes one or more client computing devices 104A, 104B that may be used by one or more users 102A, 102B, a network 108, a module server 110, retailer server 114, and application server 116A, 116B. In examples, client devices 104A, 104B, module server 110, retailer server 114, and application servers 116A, 116B communicate using network 108, such as a local area network, a wireless network, or the Internet, or any combination thereof, using wired and/or wireless links. It will be appreciated that while the system 100 is illustrated as including two client devices 104A, 104B, one network 108, one module server 110, one retailer server 114, and two application servers 116A, 116B, system 100 may also be appreciated in other examples comprising alternate quantities and topologies of such elements.

Client device 104A may be any of a variety of devices, not necessarily being the same variety of device as client device 104B, including, but not limited to, a mobile computing device, tablet computing device, desktop or laptop computing device, IoT computing device, server computing device, or distributed computing device. Client device 104B has elements similar to computing device 102, and may be configured in a same or similar way.

Module server 110 may be a server for accessing, temporarily or permanently, retailer server 114 and application servers 116A, 116B over network 108 to create, store, or send adaptive UI module 112 across module server 110 and application servers 116A, 116B. Module information 113 may be based on information obtained from retailer server 114, as indicated by the functionality of the underlying software simplified and stored in adaptive UI module 112 as the module information 113. For example, the module information 113 may be used to display supplemental content 122A, 122B (e.g., expert reviews, reviews, similar products, images, explore by, buying options, shop, videos, goes well with, filters, related content, suggested content, etc.) obtained from retailer server 114. The module information 113 may be stored in the adaptive UI module 112 in a simplified form, free of formatting, such as a JSON string, or other simplified or string organization. The simplified storing mechanism of the module information 113 of the adaptive UI module 112 may allow for easy manipulation of the adaptive UI module 112 to generate or produce a formatted UI module 120A, 120B that has formatting that is synchronous with formats of application servers 116A, 116B. For example, the adaptive UI module 112 may apply a format associated with application server 116A, 116B to generate a formatted UI module 120A, 120B specific to each web application 118A, 118B, respectively.

The module information 113 of the adaptive UI module 112 may contain a variety of supplemental content, such as product information, category information, retailer information, expert reviews, reviews, similar products, images, explore by, buying options, shop, videos, goes well with, filters, related content, suggested content, or any other information targeted to specific users 102A, 102B. Additionally or alternatively, the module information 113 may generate supplemental content 122A, 122B of which at least a portion of which is associated with a specified server (e.g., retailer server 114). As an example, the module information 113 may generate supplemental content 122A, 122B of which at least half may cause a user 102A, 102B to be redirected to a retailer server 114 (e.g., Microsoft Bing™)

The formatted UI module 120A, 120B for each web application 118A, 118B may be permanently or temporarily stored on the module server 110. Additionally or alternatively, the formatted UI module 120A, 120B may be temporarily or permanently stored by application servers 116A, 116B hosting the application servers 116A, 116B or temporarily or permanently stored on the client device 104A, 104B that has loaded the web application 118A, 118B. For example, formatted UI modules 120A, 120B may be generated, stored, and provided for display on application server 116A, 116B without being stored on the module server 110, or may be stored on both module server 110 and application server 116A, 116B.

As an example, the module server 110 may receive a request from a client device 104A, 104B loading a web application 118A, 118B on web application servers 116A, 116B, for supplemental content 122A, 122B. Module server 110 may then send adaptive UI module 112 to application servers 116A, 116B, in response to the request. Application server 116A, 116B may then embed adaptive UI module 112 in web application 118A, 118B and store adaptive UI module 112 on the application server 116A, 116B. After adaptive UI module 112 is received by the application server 116A, 116B, a formatted UI module 120A, 120B may be generated from the adaptive UI module 112. The formatted UI module 120A, 120B may be specific to the format and content of the respective web application 118A, 118B. The formatted UI module 120A, 120B may be prompted upon a user selection for unique supplemental content 122A, 122B, generated from the module information 113. For example, a user selection may be associated with specific content, such as shopping information, historical information, predicted or future information, or any other information related to content displayed on the web application 118A, 118B. Additionally or alternatively, the user 102A, 102B request for supplemental content 122A, 122B may be generated when the client device 104A, 104B first loads a web application 118A, 118B, receives a user 102A, 102B selection or indication within the web application 118A, 118B, or any other indication that a formatted UI module 120A, 120B should be displayed in the web application 118A, 118B. In an example, a user 102A, 102B indication may be generated by a user 102A, 102B selection of a UI element in the web application 118A, 118B, viewing a specific region of the web application 118A, 118B, or any other action or indication that the formatted UI module 120A, 120B should be displayed on the web application 118A, 118B at the client device 102A, 104B.

Upon receiving the request from the client device 104A, 104B to generate a formatted UI module 120A, 120B, the application server 116A, 116B may determine the format or environment of the web application 118A, 118B loaded on the client device 104A, 104B by identifying formatting elements of the application server 116A, 116B. As an example, the formatting elements of application server 116A, 116B may include various criteria such as space/dimensions, surrounding content/context, latency requirements, freshness of data, fonts, cannibalization of other UI features, other requirements, or any other information or means of identifying format or content displayed by the web application 118A, 118B. More criteria may be used to evaluate the environment of the web application 118A, 118B and determine a format for the formatted UI module. In a further example, the formatting elements or environment criteria may be determined in a variety of ways, such as by a look-up database, in either the adaptive UI module 112 or by the module server 110, maintaining formatting elements or information about specific web applications, or additionally or alternatively retrieving the formatting elements directly from the web application 118A, 118B, or any other means of determining formatting elements of application server 116A, 116B. In one example, determining a format may result in rearranging or selecting a set of module information 113 of the adaptive UI module 112, such as a set of content, a set of formatting elements, or any set or combination of sets that may be used to adapt, synchronize, blend, or group display features of the formatted UI module 120A, 120B uniquely with each web application 118A, 118B.

After the format of the web application 118A, 118B is determined from formatting elements or criteria and the evaluated environment, the adaptive UI module 112 may use the determined format and information associated with the user selection for a formatted UI module to adapt the module information 113 and produce unique supplemental content 122A, 122B. The adaptive UI module may then generate a formatted UI module 120A, 120B. In this example system 100, the adaptive UI module 112 may generate two formatted UI modules 120A, 120B, each formatted uniquely to mimic the format of each web application 118A, 118B, respectively. It should be appreciated that more than one unique formatted UI module 120A, 120B could be produced for a single web application 118A, 118B, which may depend on differences in user 102A, 102B feedback associated with the user selection, or different indications, for a formatted UI module 120A, 120B, as discussed herein. After generating the one or more formatted UI modules 120A, 120B, the adaptive UI module 112 may send instructions to the client device 104A, 104B to display the formatted UI module 120A, 120B in the web application 118A, 118B. The formatted UI module 120A, 120B may be embedded in the web application 118A, 118B by the application server 116A, 116B before being displayed by the client device 104A, 104B.

Figure 2:
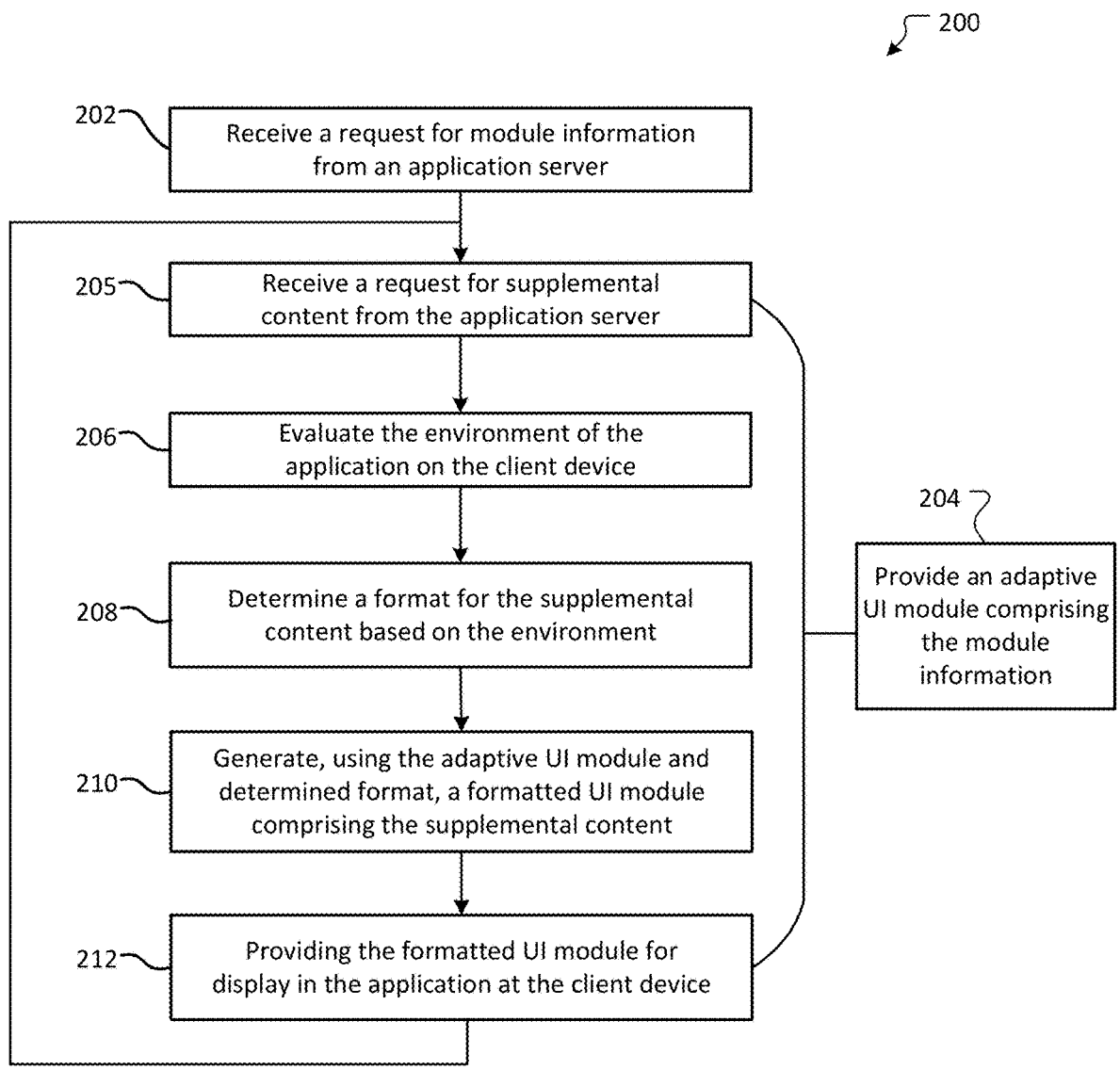
FIG. 2 illustrates an overview of an example method for modularizing and embedding supplemental content, from the module server perspective.

FIG. 2 illustrates an overview of an example method for modularizing and embedding supplemental content (e.g., supplemental content 122A, 122B), from the module server perspective. Method 200 begins at operation 202 where a module server (e.g., module server 110) receives a request for module information (e.g., module information 113) from an application server (e.g., application server 116A, 116B) that provides an application (e.g., web application 118A, 118B) on a client device (e.g., client devices 104A, 104B). This request may be generated when the application server loads an application, prior to loading an application, or any in response to any other indication that a module should be embedded or displayed in a web application.

After operation 202, method 200 progresses to operation 204 to provide an adaptive UI module (e.g., adaptive UI module 112) to the application server. The adaptive UI module may be stored temporarily or permanently on the module server or on the requesting application server, or both. Creating the adaptive UI module comprises operations 205-212. The format of the formatted UI module may be determined by the adaptive UI module by evaluating an environment of the application as in operation 206, while the content (e.g., unique supplemental content derived from module information, such as supplemental content 122A, 122B from module information 113) may be determined based on a user request in the application as in operation 208.

At operation 205, the adaptive UI module receives a selection or request for supplemental content (e.g., supplemental content 122A, 122B) from the application server. This will prompt operations 206-212 to generate and provide a formatted UI module (e.g., formatted UI module 120A, 120B) containing the supplemental content (as generated from the module information of the adaptive UI module).

At operation 206, the module server evaluates the environment of the application on the client device, which may include determining criteria of the environment. Various formatting elements or criteria, including space/dimensions, surrounding content/context, latency requirements, freshness of data, fonts, cannibalization of other UI features, or other requirements may be measured or otherwise determined from the web application requesting a formatted UI module. A collection of one or more measured or determined formatting element(s) or criteria may be used as an evaluation of the environment associated with the request for the formatted UI module. These formatting elements may vary across web application for a variety of reasons, such as differences in display device/screen size/shape/type, web application window, size of various other UI elements displayed by the web application, spacing between UI elements on the web application, content displayed adjacent to or not shown in the web application, time of last information update on the web application, fonts, colors, or any other differences in visual or contextual display of the web application. The formatting elements may be determined in a variety of ways, such as by a look-up of the identified application to determine stored formatting features, retrieving the formatting elements from the web application itself, or any other means of determining formatting elements of a web application. After establishing the environment based on more or more measured or determined formatting elements, the environment is used to determine formatting and supplemental content of the formatted UI module, as adapted from module information of the adaptive UI module.

At operation 208, the module server determines a format and supplemental content of the formatted UI module, based on the environment determined in operation 206. As an example, format may be determined from formatting elements such as space/dimensions, fonts, or cannibalization of other UI features, while unique supplemental content may be determined from surrounding content/context, latency requirements, freshness of data, or content associated with the user selection for a formatted UI module, and/or specified servers to direct users via the supplemental content. In one example, determining a format may result in rearranging, determining, or selecting supplemental content (as generated from the module information) of the adaptive UI module, such as a set of content, a set of formatting elements, or any set or combination of sets that may be used to adapt, synchronize, blend, or group display features uniquely with each web application. The evaluation of the environment may be used to create a formatted UI module that is adapted from the adaptive UI module in a variety of ways, such as mirroring underlying source code elements of the web application, having pre-established formatting capabilities from which formatting may be selected based on similarity of the environment, or any other way to adapt the simple-stored module information of the adaptive UI module into a selected format with selected supplemental content for specific requests for a formatting module. For example, the adaptive UI module may receive source code from the web application, strip contextual information and replace it with supplemental content, and optionally select specific formats related to any detected formatting elements, such as size, spacing, or other formatting elements not addressed by the received source code. As another example, formatting elements determined by the evaluated environment may be individually incorporated by the adaptive UI module to adapt the module information to the detected formatting elements.

At operation 210, the module server generates a formatted UI module comprising supplemental content uniquely associated with a user selection, based on the format determined in operation 208. The formatted UI module may be an adaptation of the adaptive UI module, specifically adapted to format unique supplemental content in the adaptive UI module, as instructed by the adaptive UI module on the application server. For example, the adaptive UI module may contain general supplemental content that is stored in a simplified form, free of formatting, such as a JSON string, or other simplified or string organization. The simplified storing mechanism of the adaptive UI module may allow for easy manipulation of the adaptive UI module to generate or produce a formatted UI module that is synchronous with the formatting information used to determine a format. The adaptive UI module may contain a variety of supplemental content, such as product information, category information, retailer information, or any other information targeted to a specific user.

At operation 212, the module server provides the formatted UI module, generated in operation 210, for display in the application on the client device. After the adaptive UI module is sent to the application server, the adaptive UI module may carry out adaptability operations to create and display a formatted UI module on the client device. The formatted UI module may be prompted by a user request. For example, the request may be received when the client device first loads an application, when a user (e.g., users 102A, 102B) provides an indication after the client device enters a web application, a user selection of a UI element, or any other indication that a module should be displayed on the web application. In an example, a user may provide an indication after the client device enters a web application by selecting a user interface element of the web application (e.g., module triggering elements 612, 804 in FIGS. 5 and 8, respectively), viewing a region of the web application, or any other action or indication that the module should be displayed.

For example, the server may provide the formatted UI module to the client device for display within the application that is currently launched by the client device. As an example, the formatted UI module may be embedded within an application at various levels to satisfy secondary and tertiary user intent. As a further example, the formatted UI module may be embedded at various levels of the application so as to display in a variety of shapes and sizes, such as overlay, pop-up, panel, side pane, window expansion, or any other way to integrate the formatted UI module into the application. The formatted UI module may be permanently or temporarily stored on the module server, the application server, or both.

Method 200 may repeat operations 205-212 for different modules and different applications. For example, when repeating operations 205-212, the method may utilize different client devices, users, web applications, application servers, or any combination of differences. As an example, the method 200 may have a different client device, but have the same user and application. As another example, the method 200 may have a different client device and different user but the same application. Another example may repeat operations 205-212 with a different client, different user, and different application. Another example may have method 200 repeat operations 205-212 with a different user and the same client device and application. Another example may repeat method 200 with a different user and a different application on the same client device. A further example may repeat operations 205-212 with a different application with the same user and same client device. As another example, the method 200 may repeat operations 205-208 with a different client device, different application, and same user.

If the method 200 repeats operations, the format determined at repeated operation 208 may be different than the format determined at the original operation 208. For example, the supplemental content generated from the module information of the adaptive UI module may be different if repeated method 200 has a different user or different application. As another example, the formatting elements collected or evaluated to determine a format for the formatted UI module may be different for different users or different applications. A difference in user for repeated method 200 may result in unique module information due to differences in user preferences (e.g., targeted information may vary from user to user, in same or different applications), and may also result in unique formatting elements due to differences in user preferences. Additionally, a difference in application for the repeated method 200 may result in unique module information and formatting elements due to application-specific content and formatting.

If the method 200 repeats operations 205-212, generating a formatted UI module may not occur if the determined format of the module is identical to a format determined for a previously-generated formatted UI module (e.g., a module generated from an earlier formatted UI module). If, in an example, an identical formatted UI module was previously generated by the application server, generation of a formatted UI module may be skipped. For example, this may occur if the adaptive UI module receives an identical request from and identical web application loaded by the one or more client devices.

Figure 3:
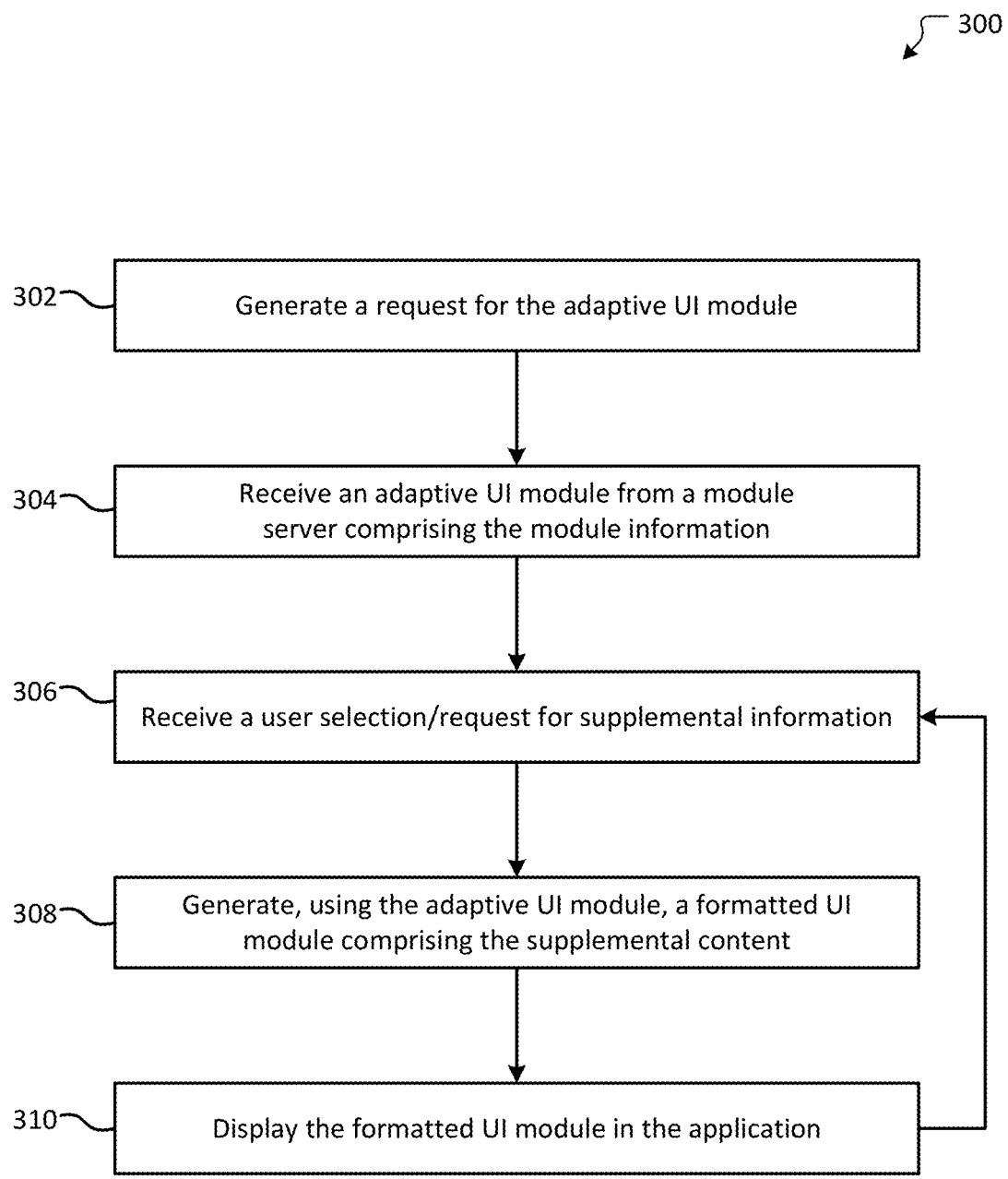
FIG. 3 illustrates an overview of an example method for modularizing and embedding supplemental content, from the application server perspective.

FIG. 3 illustrates an overview of an example method 300 for modularizing and embedding supplemental content, from the application server perspective. Method 300 begins at operation 302 where a client device (e.g., client devices 104A, 104B) generates a request for module information (e.g., module information 113), on an application provided by a server (e.g., application server 116A, 116B). This may be requested before or after the server loads the application.

Method 300 then continues to operation 304, where the client device receives, in response to the request, an adaptive UI module from a module server, the adaptive UI module comprising the requested module information. The adaptive UI module may be similar to the adaptive UI module described as element 112 in FIG. 1. The adaptive UI module may be embedded or stored on the first application server, permanently or temporarily.

Method 300 then progresses to operation 306, where a user request for supplemental content is received from a user selection at the application. The user request or indication may be generated in a variety of ways. For example, the user request or indication may be generated when the client device first loads the application, when the client device receives a user selection (e.g., from users 102A, 102B) within the application, or any other indication that a supplemental content should be displayed in the application. In an example, a user request may be generated upon a user selection of a user interface element of the web application (e.g., module triggering elements 612, 804 in FIGS. 5 and 8, respectively), viewing a region of the web application, or any other action or indication that the module should be displayed.

At operation 308, the formatted UI module is generated from the received adaptive UI module, the formatted UI module including the supplemental content indicated at operation 306. The generation of the formatted UI module may be prompted by a user request, as described above at operation 306. The formatted UI module may be an adaptation of the adaptive UI module, specifically adapted to format the requested supplemental content. The format of the formatted UI module may be determined by the adaptive UI module by evaluating an environment of the application, while the supplemental content may be determined based on a user request in the application or on the evaluated environment of the web application or association with supplemental content that may be linked or associated with a specified server (e.g., Microsoft Bing™ server). The formatted UI module may be generated in a manner similar to that described at operations 206-210 in FIG. 2. At operation 310, the formatted UI module is displayed in the application.

Method 300 may repeat operations 306-310 for different requests, modules, and applications. For example, a second user request for different supplemental content may be generated in a variety of ways used to describe generation of the first user request. The second request may be the same or different than the first request, and the second application may be the same or different than the first application. In an example where the first and second user requests are the same, and the first and second applications are different: a client device may request a formatted UI module when loading both a webpage and an email application. In an example where the first and second user requests are different, and the first and second applications are the same: within a single webpage, a first formatted UI module may be requested upon loading of the page, and a second formatted UI module may be requested upon a user selection of a UI element in the webpage. In an example where the first and second user requests are different, and the first and second applications are different: a first formatted UI module may be requested upon opening a webpage and subsequently a second formatted UI module may be requested upon a user selecting a UI element of an email application.

Figure 4:
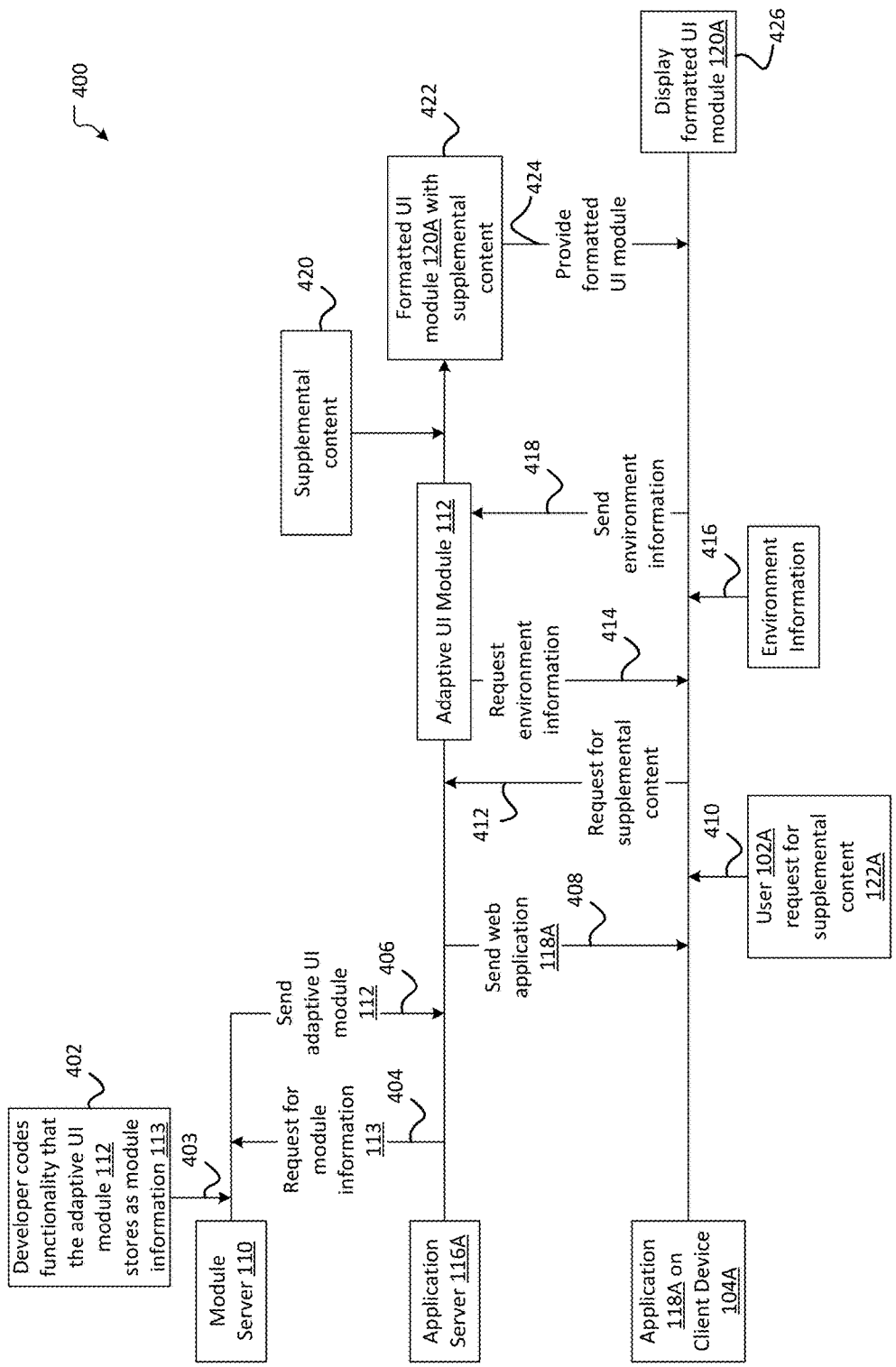
FIG. 4 illustrates an example flow diagram for modularizing and embedding supplemental content.

FIG. 4 illustrates an example flow diagram 400 for a system for modularizing and embedding supplemental content, such as the system 100 shown in FIG. 1. Like system 100, the system shown in FIG. 4 includes a module server (e.g., module server 110) containing an adaptive UI module (e.g., adaptive UI module 112), application server (e.g., application server 116A), and a web application (e.g., web application 118A) loaded on a client device (e.g., client devices 104A, 104B). At operation 402, a developer codes functionality for the adaptive UI module, where the functionality may be modified by the adaptive UI module and stored in the adaptive UI module as module information (e.g., module information 113). This functionality is stored at the module server 110 at operation 403. At operation 404, the application server 116A module information 113 from the module server 110. At operation 406, the module server 110, in response to the application server's request 404 for module information, sends the adaptive UI module 112 back to the module server 110. At a later time, the application server sends at operation 408 a web application 118A to load on a client device 104A. A user of the client device 104A makes a request for supplement content via the loaded web application at operation 410. At operation 412, the user request for supplemental content is sent from the client device 104A to the application server 116A. At operation 414, the adaptive UI module 112 (stored on the application server 110) requests environment information from the application 118A loaded on the client device 104A, which usually happens in response to the request for supplemental content. The environment information may depend on the client device itself. At operation 416, the client device 104A or the application 118A, or both, gathers environment information and sends the environment information to the adaptive UI module 112 on application server 116A at operation 418. At operation 422, the adaptive UI module uses the module information and the environment information to generate a formatted UI module with the supplemental content 420 requested by the user. At operation 424, the application server 118A provides the formatted UI module 120A to the application 118A on the client device 104A. At operation 426, the application 118A on the client device 104A displays the formatted UI module 120A with the supplemental content that was requested by the client.

Figure 5:
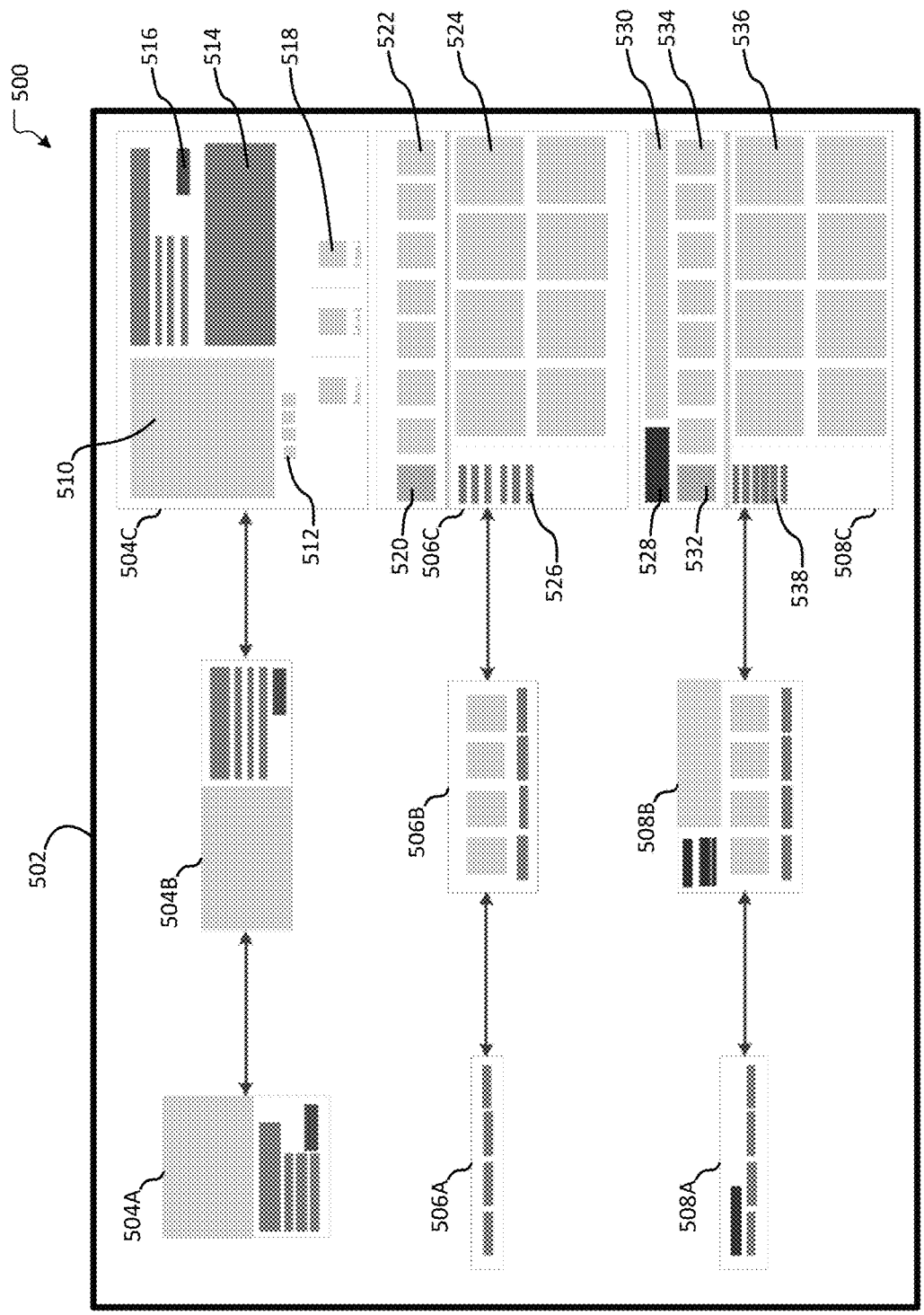
FIG. 5 illustrates example modules to be displayed on a user interface.

FIG. 5 illustrates example modules 504A-C, 506A-C, 508A-C to be displayed on a user interface 500. As described herein, modules may contain visual or contextual information, such as supplemental content. For example, the visual or contextual information (e.g., supplemental content) may include product information, category information, retailer information, or any other information that may aid a user during online shopping or browsing. The type of targeted information contained in the module may impact various visual appearances of the module when the module is displayed by the client device (e.g., as described in operations 208, 306, 312). Additionally or alternatively, the visual appearance of the module within an application 502 may also be impacted by the detected format of the application 502 (e.g., as described in operation 204). For example, the module may have small (e.g., modules 504A, 506A, 508A), medium (e.g., modules 504B, 506B, 508B), or large (e.g., modules 504C, 506C, 508C) dimensions to display module information such as supplemental content.

The internal layout of the module may be partially based on detected formatting elements or criteria of the evaluated environment of the web application to apply to the module. For example, modules for product information (e.g., modules 504A, 504B, 504C) may include supplemental content related to a specific product, such as images of the product, related items, reviews, buying options, pricing, specified servers hosting the supplemental content (e.g., to redirect users), and any other information related to a specific product. As another example, modules for category information (e.g., modules 506A, 506B, 506C) may include supplemental content relating to various products or groups of products, related categories, and any other information related to a category. As a further example, modules for retailer information (e.g., modules 508A, 508B, 508C) may include supplemental content about various buying information for products or categories of products, various purchasing options from within the module or rerouting to a different application, or any other information related to retailers for a product or category.

As depicted in FIG. 5, a large product module (e.g., module 504C) may have a variety of supplemental content. In this embodiment, module 504C has supplemental content that includes a main product image 510, additional product images 512, contextual information 514 about the product (e.g., a product description, purchasing information, product options, reviews, or any other information displayed in text form about or relating to the product), clickable UI elements 516 (e.g., purchasing button, link to other sources, etc.), and images of related products 518. Small, medium, and large product modules 504A-C may contain one or more of the content items (e.g., elements 510-518) described with respect to large product module 504C. For example, small product module 504A may display only the main product image 510, contextual information 514, and a clickable UI element 516. In another example, medium product module 504B may display the same elements as small product module 504A, but in a different configuration or size.

In another example, large category modules 506C may have a variety of supplemental content different than that contained in product modules 504A-C. In this embodiment, module 506C has supplemental content that includes a selected category 520, other available categories 522, category images 524 associated with the selected category 520, and textual information 526 (e.g., information associated with the selected category 520 or category images 524). Small, medium, and large category modules 506A-C may contain one or more of the content items (e.g., elements 520-526) described with respect to large category module 506C. For example, small category module 506A may display only textual information 526. In another example, medium category module 504B may display only category images 524 and textual information 526.

In another example, large retailer module 508C may have a variety of supplemental content different than that contained in modules 504A-C, 506A-C. In this embodiment, module 508C has supplemental content that includes a selected retailer 528 (e.g., a retailer logo, name, brand, or other retailer-identifying information), selected retailer information 530 (e.g., locations, sales, deals, related brands, etc.), selected retailer category 532 (e.g., categories of items sold by the selected retailer 528), other retailer categories 534, retailer images 536 (e.g., products sold by the selected retailer 528 in the selected retailer category 532), and textual information 538 (e.g., information associated with the selected retailer 528, selected retailer category 532, or retailer images 536). Small, medium, and large retailer modules 508A-C may contain one or more of the content items (e.g., elements 528-538) described with respect to large retailer module 508C. For example, small retailer module 508A may display only the selected retailer 528 and textual information 538. In another example, medium retailer module 508B may display only the selected retailer 528, selected retailer information 530, other retailer categories 534, and textual information 538.

Although the embodiments discussed with respect to FIG. 5 described supplemental content using specific examples relating to product, category, and retailer information, supplemental content may be images, audio, video, text, or any other form of information exchange.

These modules 504A-C, 506A-C, 508A-C may be positioned along various portions of the application 502. Additionally, these modules 504A-C, 506A-C, 508A-C may be displayed in a variety of layers within the application 502, including overlay, pop-up, panel, side pane, window expansion, or any other way to integrate the formatted UI module into the application 502. Layering may depend on the evaluated environment of the application 502. For example, limited spacing between existing UI elements on the application 502 may generate a module 504A-C, 506A-C, 508A-C in an overlay or panel, to prevent cannibalizing the UI elements already existing in the application 502. In another example, an application 502 displaying UI elements in a row-and-column layout may generate a module 504A-C, 506A-C, 508A-C that is injected into the application 502 itself, resulting in screen expansion to display supplemental content in between the existing UI elements of the application 502.

Figure 6A:
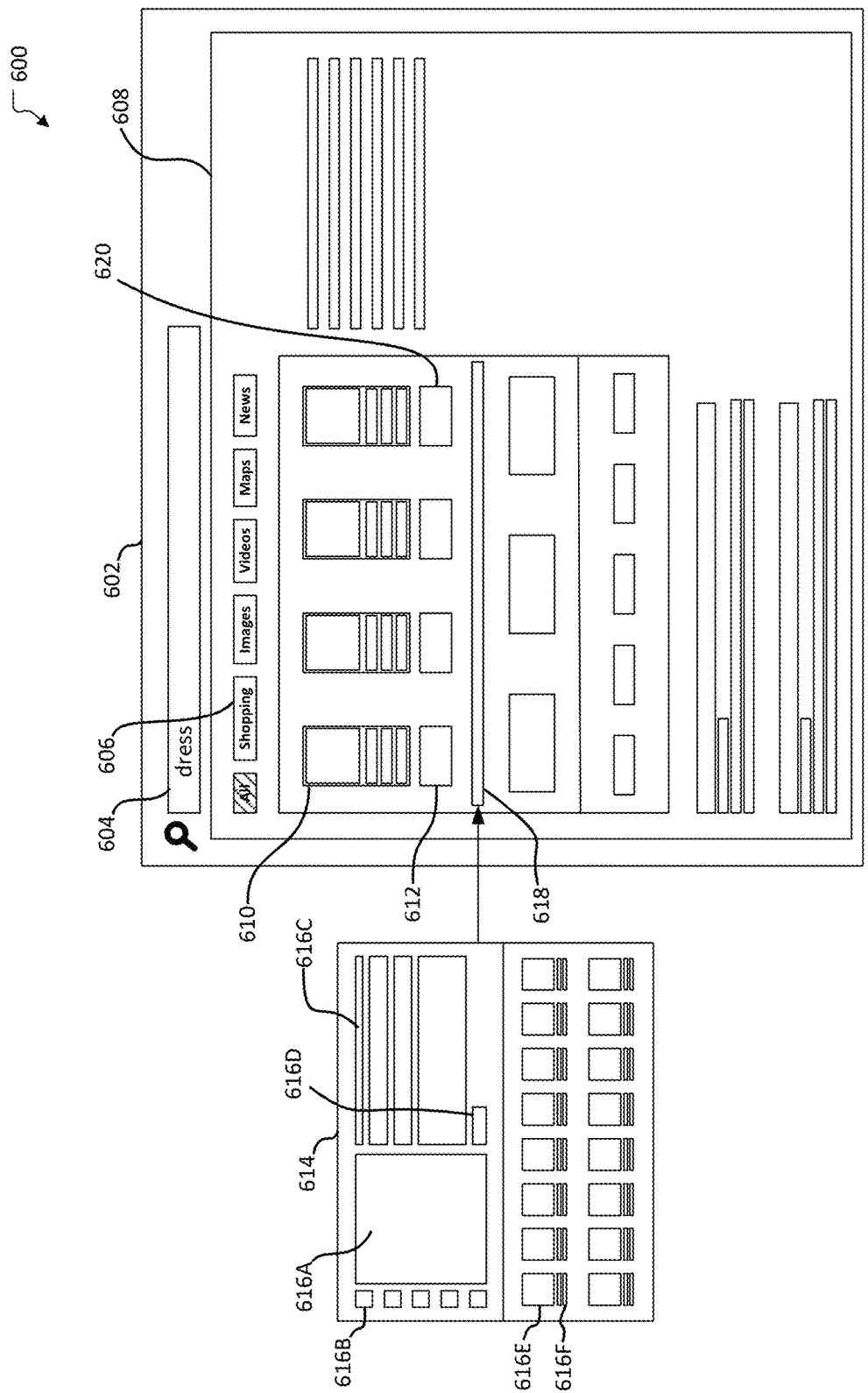
FIG. 6A illustrates an example user interface with a search engine web application and triggering element.

FIG. 6A illustrates an example user interface 600 with a search engine web application 602 and triggering element 612. As shown in FIG. 5, a user has entered a search query for "dress" within a search bar 604 of the search engine web application 602. Within one of the category tabs 606 on the search engine results page (SERP) 608 of the web application 602, there may be a triggering element 612 associated with a results item 610. Upon a user selection or indication of the triggering element 612, a formatted UI module 614 may be displayed in the web application 602, that contains supplemental content related to the triggering element 612 associated with the results item 610. This formatted UI module 614 may be stored or embedded within a server hosting the web application 602. The formatted UI module 614 may be generated in a variety of ways, as discussed herein (e.g., with respect to generation of a formatted UI module from an adaptive UI module). Additionally, the formatted UI module 614 may be stored temporarily or permanently in the web application 602. Additionally or alternatively, the formatted UI module 614 may be embedded in the web application 602. In this example, the formatted UI module 614 is embedded in the web application 602 via page expansion at expansion area 618.

As shown, formatted UI module 614 is an example of a large product module, such as large product module 504C in FIG. 5. The formatted UI module 614 includes a variety of supplemental content related to the triggering element 612 and associated results item 610, such as a main results item image 616A, other results item images 616B, textual information 616C about the results item 610, linked content 616D, and other results item related visual information 616E or textual information 616F.

Describing this embodiment further, a portion of the SERP 608 displays UI elements in a grid-like or rows-and-columns layout. The space between rows or columns may be expanded to inject the formatted UI module 614 into the grid of the SERP 608 at expansion area 618 so that the formatted UI module 614 displays supplemental content within the SERP 608, after a user selection of the triggering element 612 (indicating a display of the formatted UI module 614). Although this example is shown in the "all" tab of the category tabs 606 of the SERP 608, it should be appreciated that other category tabs 606 of the SERP 608 may also support similar display of the formatted UI module 614. Additionally, formatted UI module 614 may be unique to triggering element 612, such that a selection of a different triggering element 620 may generate a module different than formatted UI module 614 (e.g., a module with different supplemental content and/or in a different layout) by using the same underlying adaptive UI module (e.g., adaptive UI module 112).

Figure 6B:
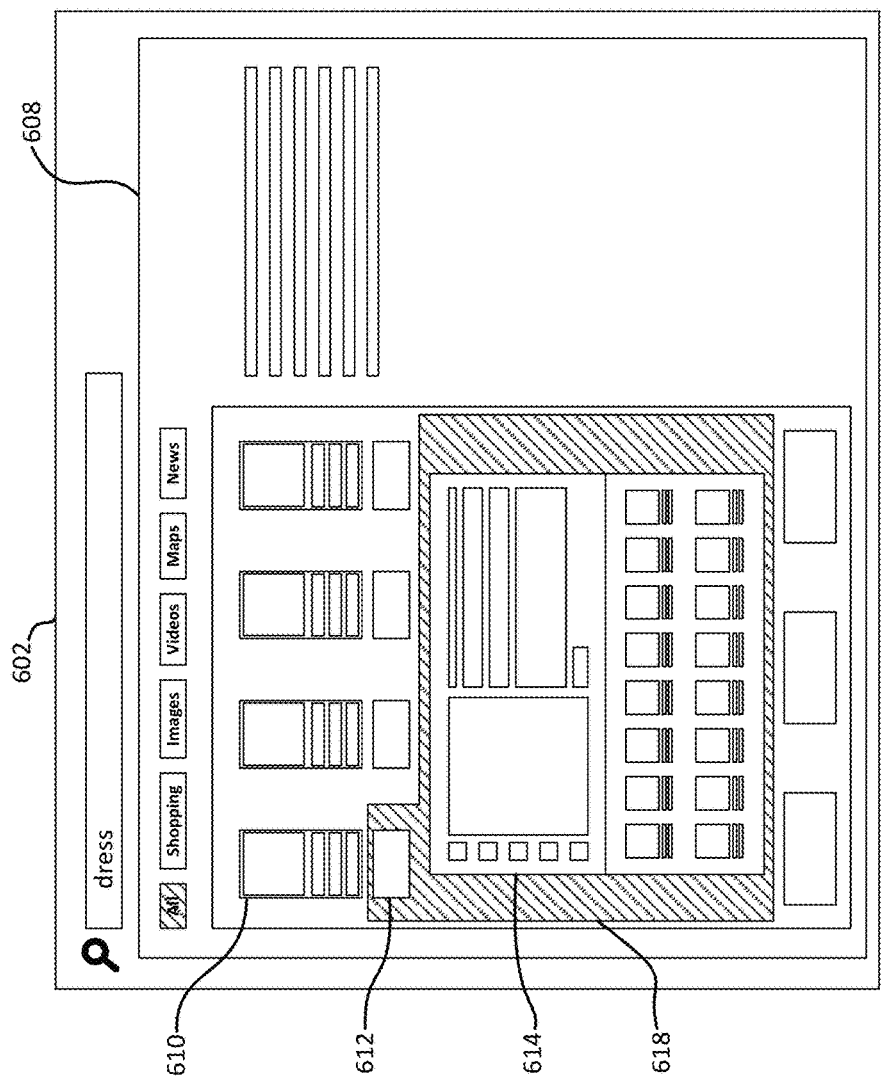
FIG. 6B illustrates a formatted UI module embedded in the search engine web application of FIG. 6A, after a user selection of the triggering element.

FIG. 6B illustrates the formatted UI module 614 of FIG. 6A embedded in the SERP 608 of the web application 602, after a user selection of the triggering element 612. As shown, the 614 formatted UI module 614 is displayed within the SERP 608 at expansion area 618. The preexisting UI elements shown in the SERP 608 are not cannibalized and instead are relocated about the grid of the SERP 608 to allow display of the formatted UI module 614 in addition to what was already shown in the SERP 608. Formatted UI module 614 mimics the formatting and structure of the search engine web application 602, and displays supplemental content related to the triggering element 612 and related results item 610.

Figure 6C:
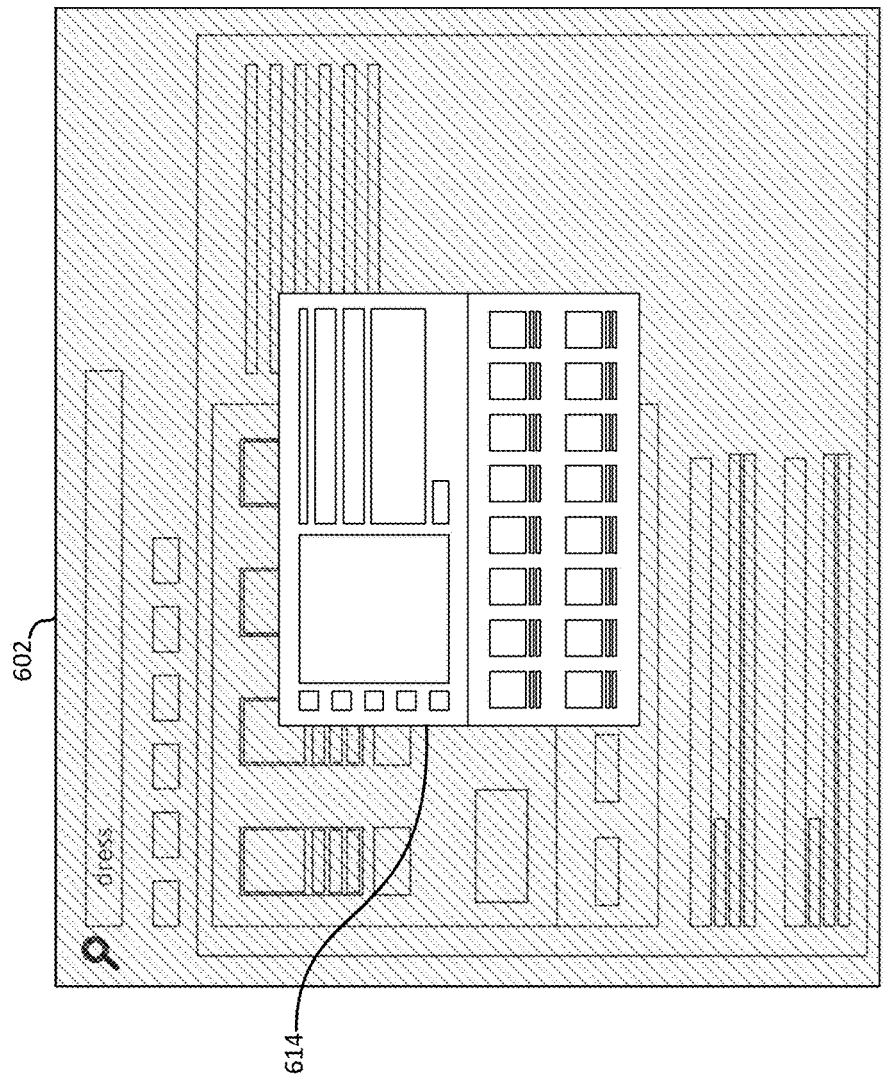
FIG. 6C illustrates the formatted UI module of FIG. 6B, embedded in an overlay of the search engine web application.

FIG. 6C illustrates the formatted UI module 614 of FIG. 6B, embedded in an overlay of the search engine web application 602. In this embodiment, formatted UI module 614, on a user selection of the triggering element 612, may display as an overlay on top of search engine web application 602. The overlay of formatted UI module 614 allows the user interface 600 to maintain the SERP 608 for "dress" in the background, while displaying formatted UI module 614 in a window appearing in front of the SERP 608.

Figure 7:
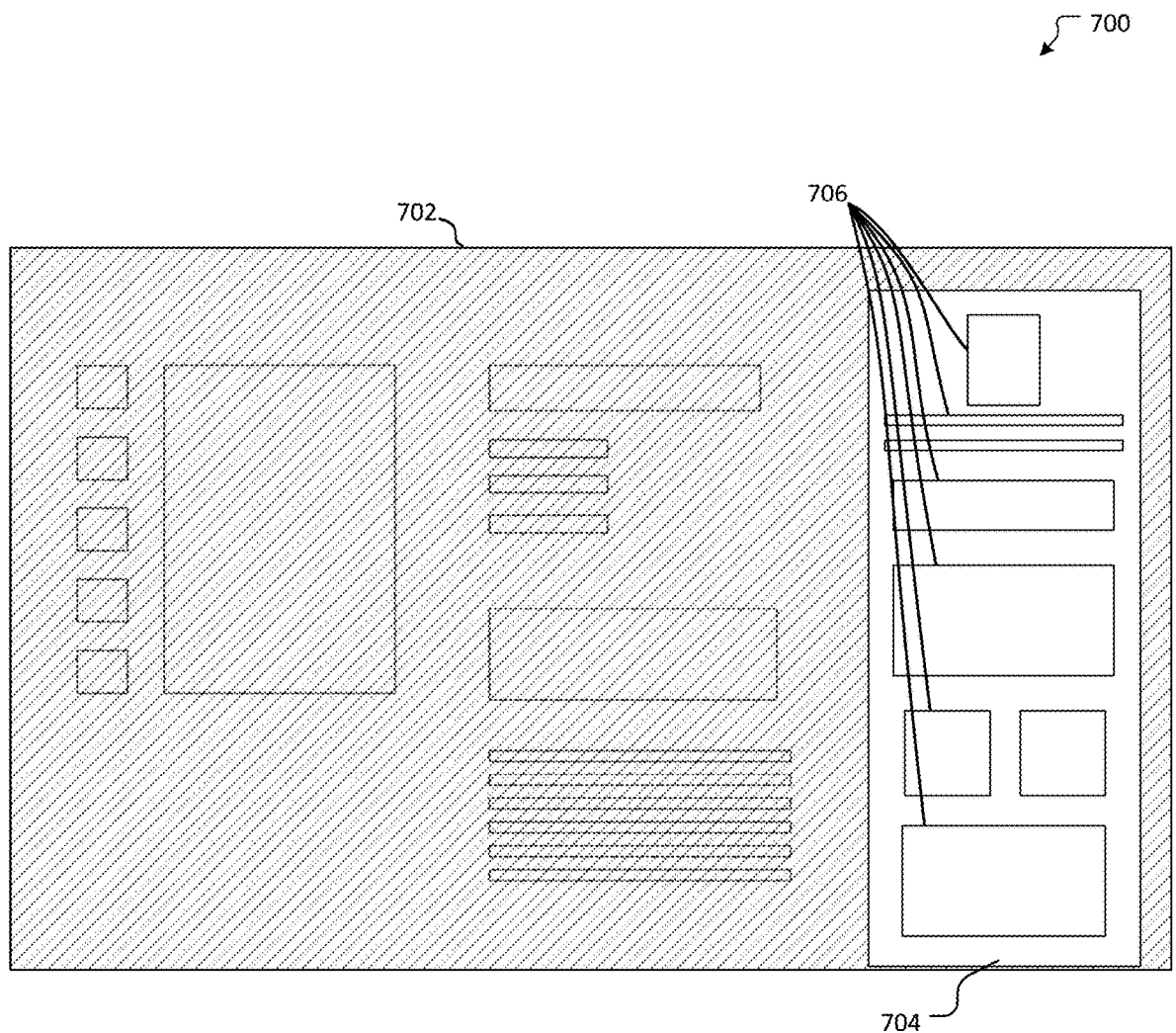
FIG. 7 illustrates an example user interface with a retailer web application and overlaid formatted UI module.

FIG. 7 illustrates an example user interface 700 with a retailer web application 702 and overlaid formatted UI module 704. In this embodiment, a user has loaded a product of a retailer within the retailer web application 702. When a user selects a display of supplemental content (e.g., by selecting a triggering element, such as triggering elements 612, 620 in FIG. 5), a module 704 may be displayed in the retailer web application 702 related to the loaded product. In this example, the module 704 is embedded in the retailer web application 702 via side panel, which may or may not overlay the contents of the loaded retailer product.

As shown, module 704 may be an example of a medium retailer module, such as medium retailer module 508B in FIG. 5. The module 704 may include a variety of supplemental content. In this example, the supplemental content contained in the module 704 includes supplemental content 706 such as a product image, textual information about the product, a link to external sources, an interactive price trend graph, coupons, similar product information such as images and text, a reviews grid, and text of an example review.

Figure 8A:
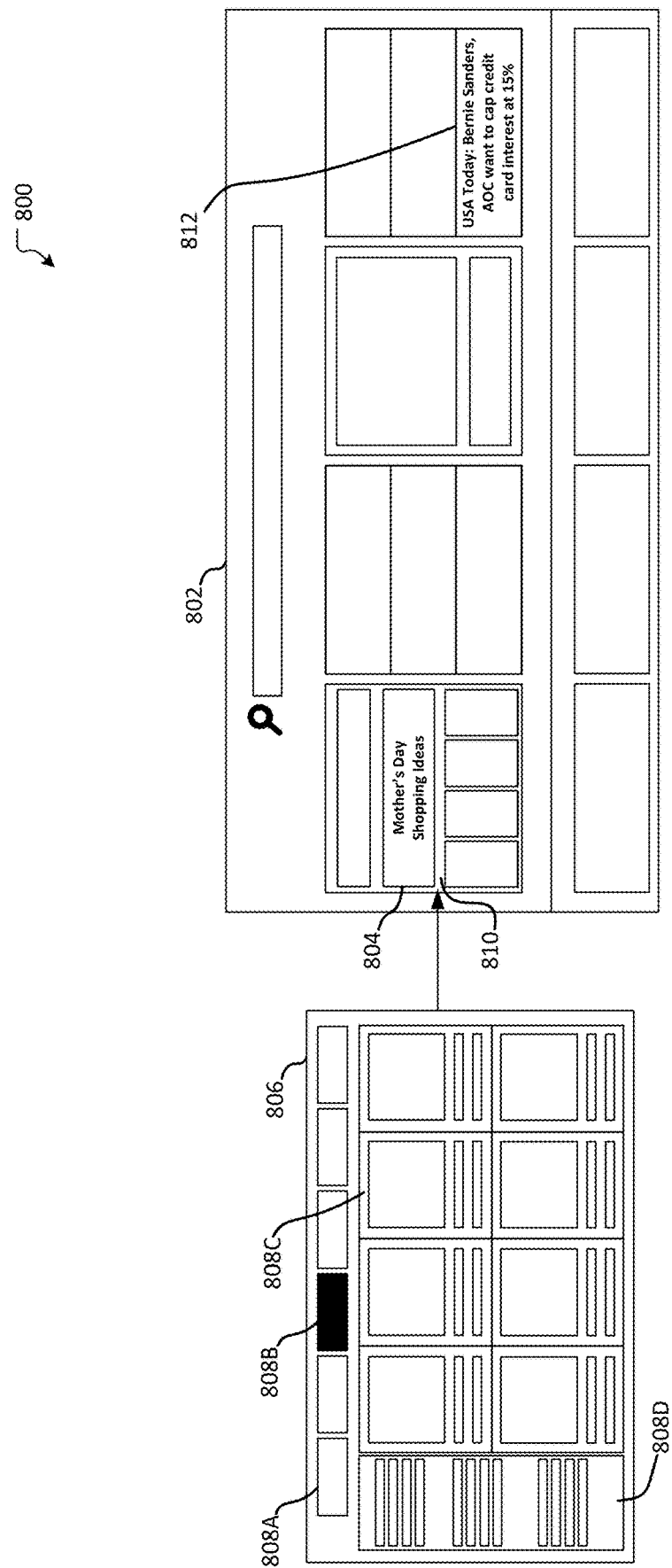
FIG. 8A illustrates an example user interface with a news web application and triggering element.

Another embodiment, shown in FIG. 8A, illustrates an example user interface 800 with a news web application 802 and triggering element 804. In this embodiment, the news web application 802 may have a triggering element 804 that, when selected, is an indication to display supplemental content via module 806. Upon a user selection or indication of the triggering element 804 (to view shopping content about Mother's Day Shopping Ideas), a module 806 may be displayed in the news web application 802 through page expansion at expansion area 810. As shown, module 806 may be an example of a large category module, such as large category module 506C in FIG. 5. The module 806 may include a variety of supplemental content, such as an module categories 808A related to the triggering element 804, a selected module category 808B, visual and textual category items 808C related to the selected module category 808B, and filtering elements 808D to allow limited category items 808C to be displayed.

Describing this embodiment further, a portion of the news web application 802 displays UI elements in a grid-like or rows-and-columns layout, near or at expansion area 810. The space between rows or columns may be expanded to inject the module 806 into the grid of the news web application 802 at expansion area 810 so that the module 806 may display supplemental content within the news web application 802, after a user selection or indication of the triggering element 804 (indicating a display of the module 804). Although this example shows a triggering element 804 and supplemental content related to shopping, it should be appreciated that other triggering elements (such as triggering element 812) and other supplemental content may not be related to shopping. For example, an indication of triggering element 812 (relating to politics) may generate a module containing supplemental content relating to other information or news about politicians, upcoming elections, historical voter information, or other information related to politics or other related politicians. As a further example, a module generated from triggering element 812 may have different supplemental content and/or a different layout than module 806, even though the different modules are generated from the same adaptive UI module (e.g., adaptive UI module 112) as stored by the server hosting the news web application 802.

Figure 8B:
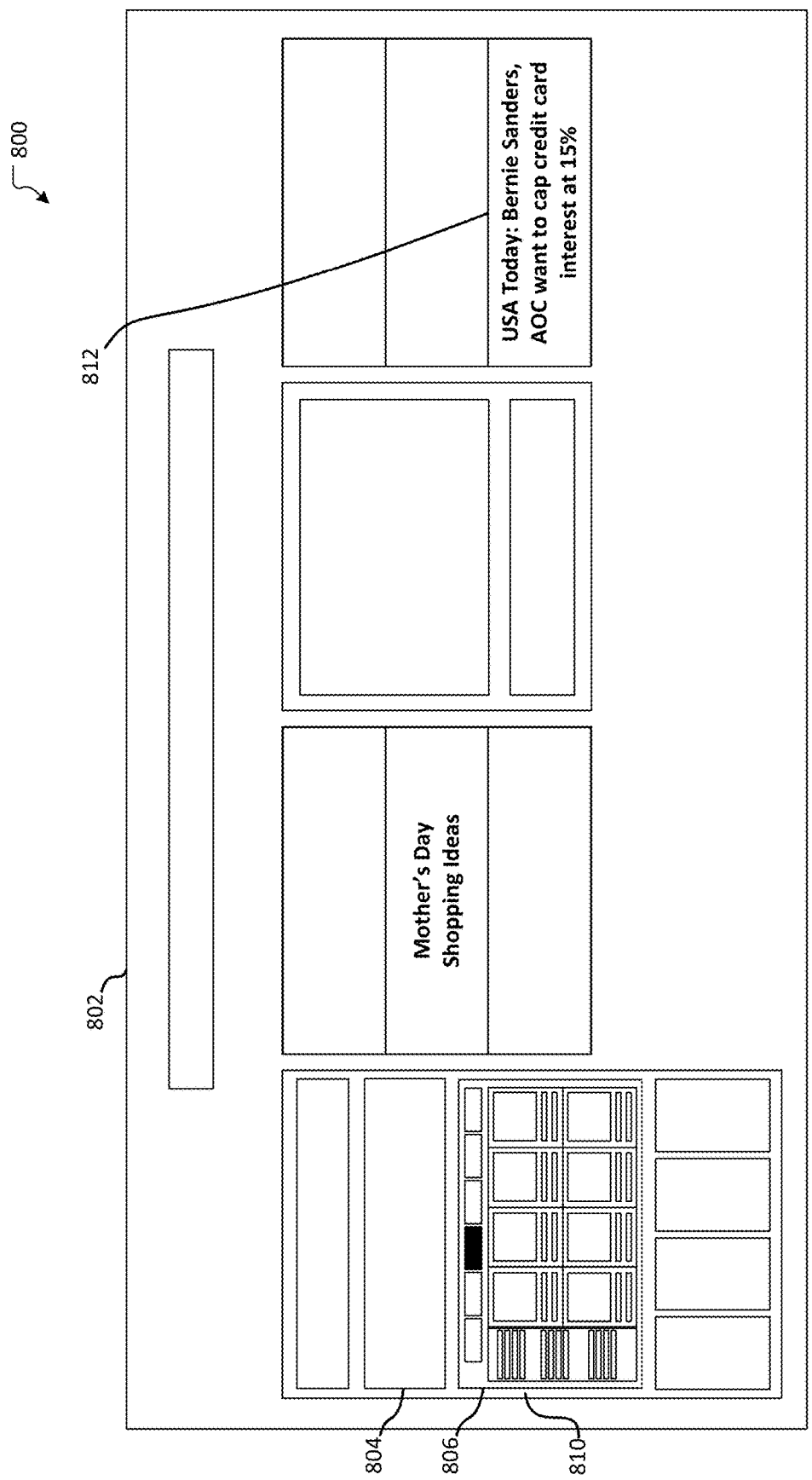
FIG. 8B illustrates the formatted UI module of FIG. 8A, embedded in the news web application of FIG. 8A, after a user selection of the triggering element.

FIG. 8B illustrates the formatted UI module 806 of FIG. 8A, embedded in the news web application 802 at expansion area 810, after a user selection of the triggering element 804. As shown, the module 806 is displayed within the same section as the triggering element 804 at expansion area 810. The preexisting UI elements shown in the news web application 802 are not cannibalized and instead are relocated about the grid of the area only adjacent to the triggering element 804 to allow display of the module 806 in addition to what was already shown in the news web application 802 prior to the user selection of the triggering element 804. Module 806 mimics the formatting and structure of the news web application 602, and displays supplemental content related to the triggering element 804.

FIGS. 6A-8B illustrate different modules 614, 704, 806 that were generated using the same adaptive UI module (e.g., adaptive UI module 112) obtained from a module server (e.g., module server 110). Although FIGS. 5-8 illustrate web applications in the form of webpages, it should be appreciated that applications may be applications other than webpages.

Figure 9:
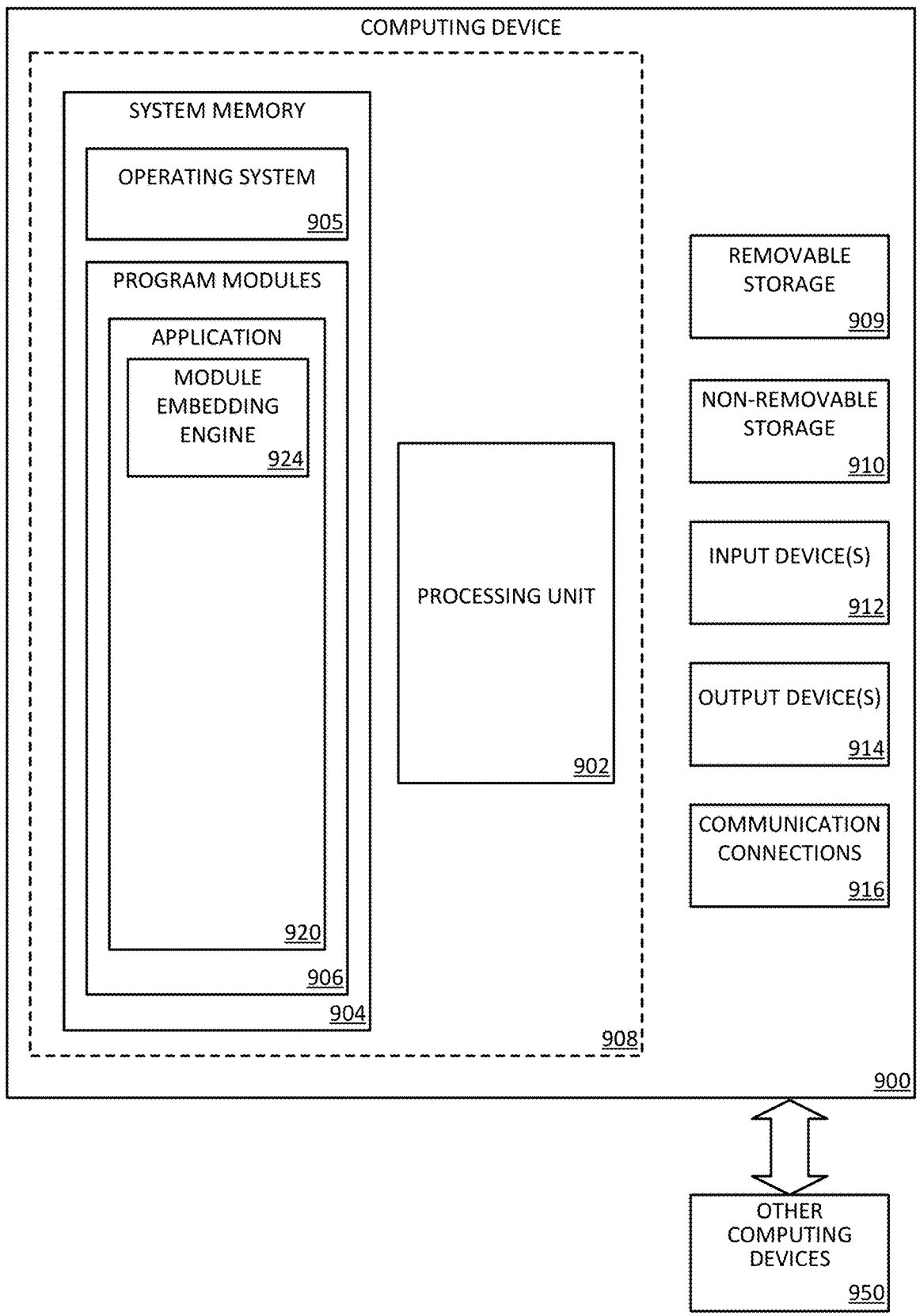
FIG. 9 illustrates a block diagram illustrating example physical components of a computing device with which aspects of the disclosure may be practiced.
Figure 10A:
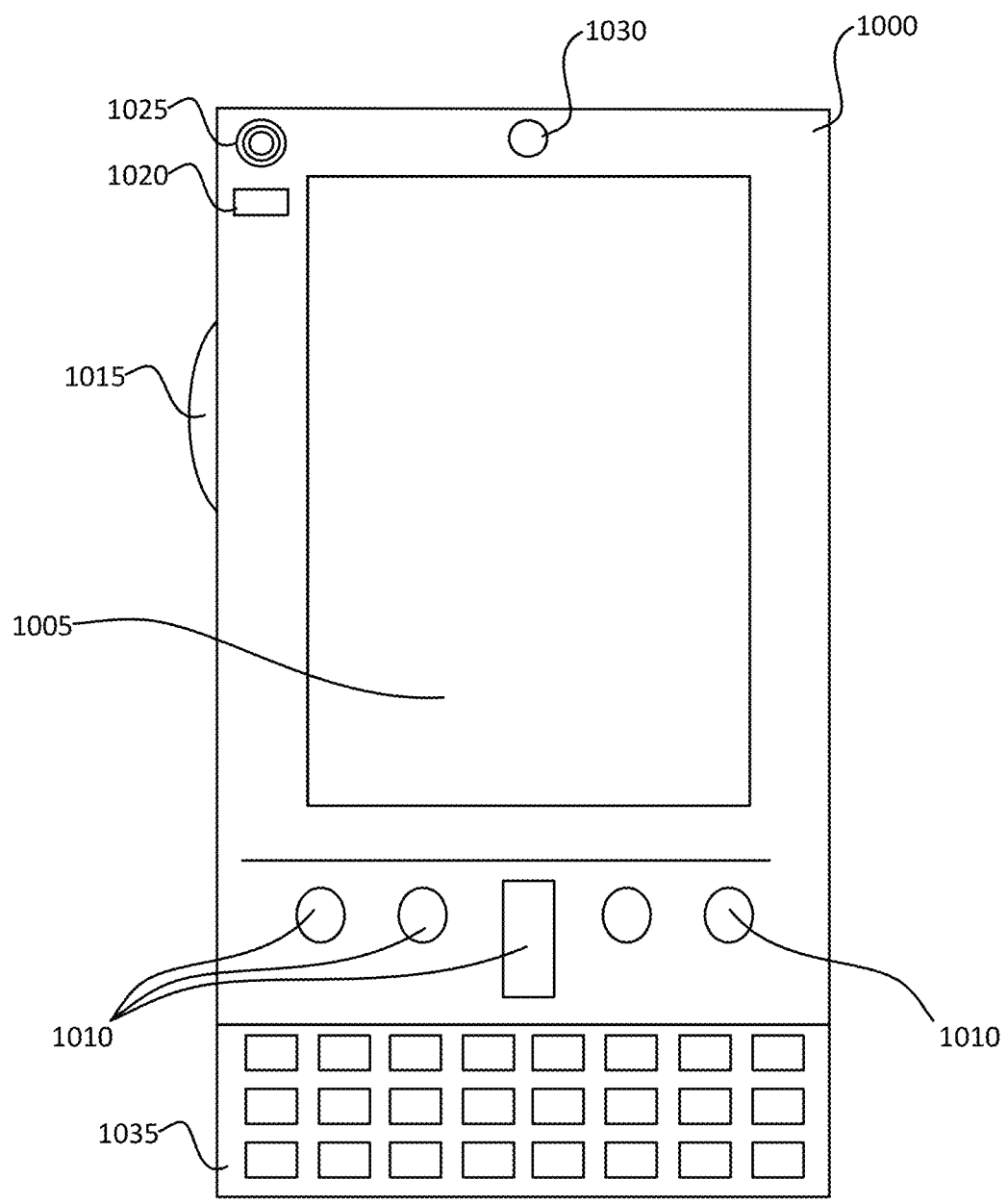
FIGS. 10A and 10B illustrate simplified block diagrams of a mobile computing device with which aspects of the present disclosure may be practiced.
Figure 10B:
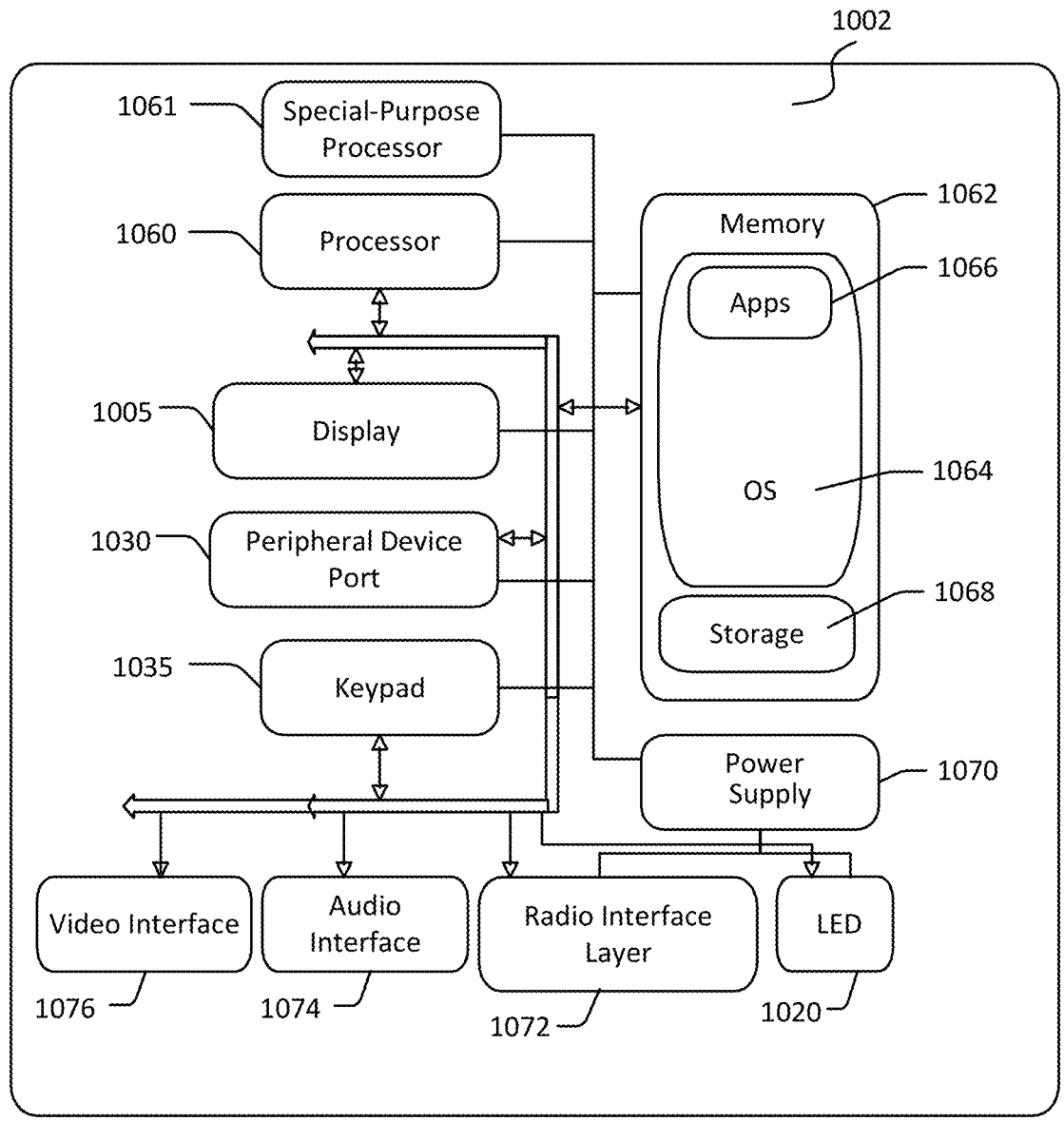
Figure 11:
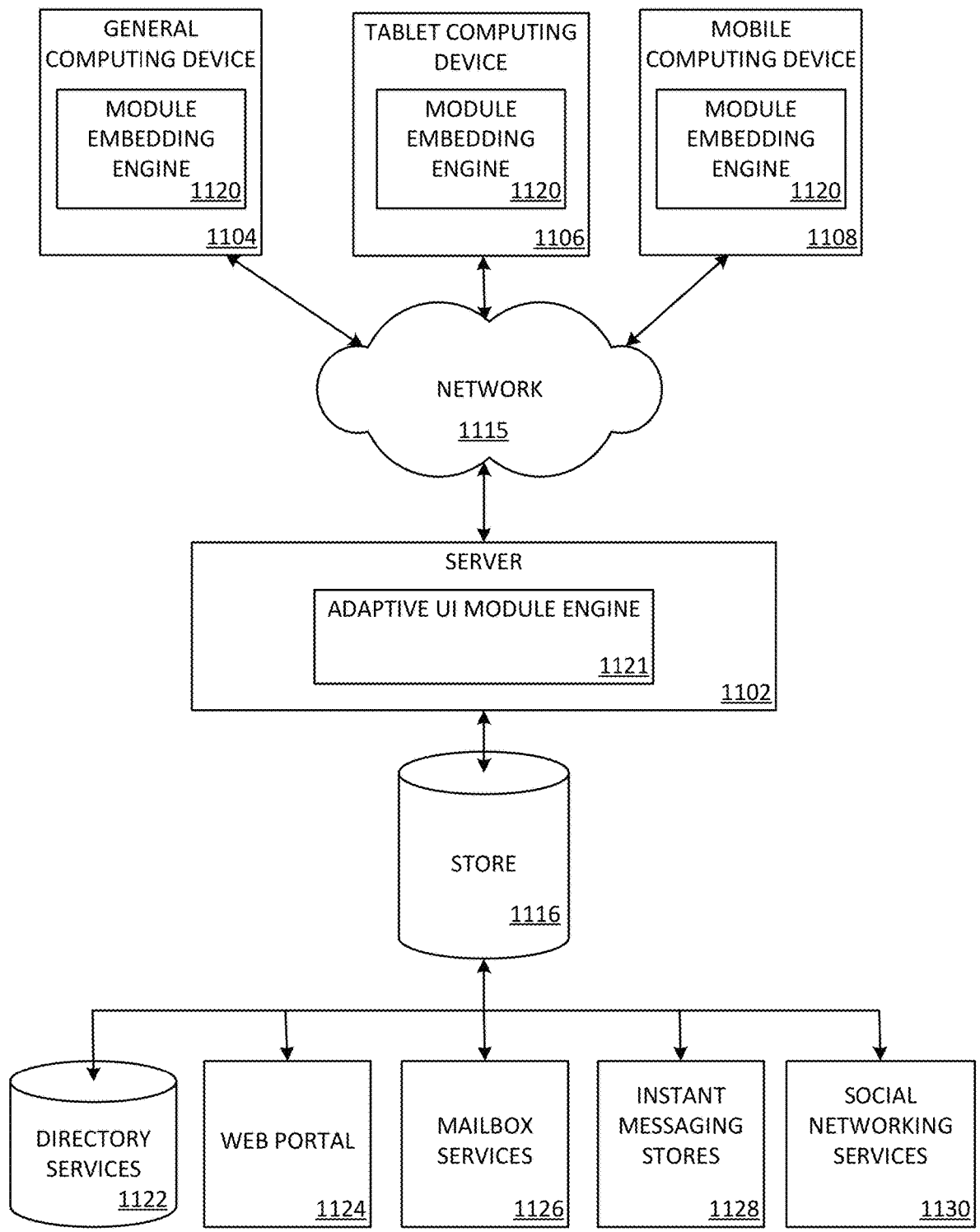
FIG. 11 illustrates a simplified block diagram of a distributed computing system in which aspects of the present disclosure may be practiced.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above, including the client devices 104A, 104B and the module server 110 in FIG. 1. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store the module embedding engine 924. The operating system 907, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the at least one processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 970. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

An exemplary mobile computing device 1000 may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130.

A module embedding engine 1120 may be employed by a client that communicates with server device 1102, and/or the adaptive UI module engine 1121 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

In accordance with some examples of the present disclosure, a system is provided. In one aspect, there is a system comprising a processor and memory storing computer-executable instructions. When the executable instructions are executed by the processor, they cause the processor to: send a module request for module information from an application server, and receive an adaptive UI module comprising the module information. The adaptive UI module performs adaptability operations comprising: receiving a user request for supplemental content from a client device; evaluating an environment of an application at the client device; determining a format for the supplemental content based on the environment; generating, using the module information and the format, a formatted UI module comprising the supplemental content; and providing the formatted UI module for display in the application at the client device.

In an example, the adaptability operations may further comprise receiving a second user request for the supplemental content from a second client device; evaluating a second environment of a second application at the second client device; determining a second format for the supplemental content based on the second environment; generating, using the module information and the second format, a second formatted UI module comprising the supplemental content; and providing the second formatted UI module for display in the second application at the second client device. In another example, the adaptability operations may further comprise receiving a third user request for second supplemental content from the first client device; generating, using the module information and the first format, a third formatted UI module comprising third supplemental content; and providing the third formatted UI module for display in the first application at the client device. In yet another example, the application is different than the second application and comprises one or more of: a webpage, an email service, and a video-streaming service. In another example, the supplemental content is based at least in part on a query searched by the application. In yet another example, the supplemental content comprises one or more of: visual content and textual content. In another example, the format is determined at least in part by using one or more of: an application lookup database and formatting elements received from the application. In another example, the module information is developer coded functionality. In another embodiment, the computer-executable instructions that, when executed by the processor, cause the processor to embed the adaptive UI module in the application. In another example, the formatted UI module is displayed at the client device in one or more of the following ways: overlay, side panel, pop-up window, and window inlay expansion. In a further example, the supplemental content comprises shopping content. In yet another example, the shopping content comprises one or more of products, categories, and retailers.

In accordance with some aspects of the present disclosure, a method is of providing supplemental content within web applications is provided. The method comprises generating a module request for module information; receiving, in response to the module request, an adaptive UI module from a module server, the adaptive UI module comprising the module information; receiving a user request for supplemental content; generating, using the adaptive UI module, a formatted UI module comprising the supplemental content; and providing for display the formatted UI module.

In an example, the adaptive UI module performs adaptability operations comprising evaluating an environment of the application at the client device; determining a format for the supplemental content based on the environment; and generating, using the module information and the format, a formatted UI module comprising the supplemental content. In another example, the method of providing supplemental content within web applications may further comprise receiving a second user request for second supplemental content; generating, using the adaptive UI module, a second formatted UI module comprising the second supplemental content; and providing for display the second formatted UI module. In yet another example, the display of the supplemental content comprises one or more of: visual content and textual content. In a further example, the module information is developer coded functionality.

In accordance with some examples of the present disclosure, another method is provided. This method comprises receiving a web application from an application server, wherein the web application comprises content, a trigger for supplemental content, and an adaptive UI module embedded in the content; providing for display the web application; receiving an indication that a user has selected the trigger for supplemental content; sending environment information to the application server; receiving a formatted UI module with the supplemental content; and providing for display the formatted UI module with the supplemental content, wherein the formatted UI module is displayed within the web application.

In an example, the method may further comprise providing for display the formatted UI module in one or more of the following ways: overlay, side panel, pop-up window, and window inlay expansion. In another example, the environment information comprises one or more of: space, dimensions, surrounding content, surrounding context, latency requirements, freshness of data, or surrounding UI features.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory storing computer-executable instructions that, when executed by the processor, cause the processor to:
provide first content and second content for display in an application at a client device;
send a module request for module information from an application server; and
receive an adaptive user interface (UI) module comprising the module information and selected supplemental content, the adaptive UI module performing adaptability operations comprising:
receiving an indication that a user has selected a trigger for selected supplemental content associated with the first content from a client device, wherein the selected supplemental content has an associated type;
evaluating an environment of an application at the client device based on a plurality of formatting elements and content displayed by the application;
determining a format for the selected supplemental content based on the type of the supplemental content and associated formatting elements of the plurality of formatting elements;
adapting the received module information based on the determined format;
generating a formatted UI module comprising the selected supplemental content, wherein the formatted UI module is synchronous with the plurality of formatting elements, wherein the supplemental content is updated based on the user selection from within a currently displayed supplemental content; and
providing the formatted UI module for display within an application UI of the application at the client device, the formatted UI module located between the first content and the second content.

2. The system of claim 1, wherein the adaptability operations further comprise:
receiving a second user request for the selected supplemental content from a second client device;
determining that a new formatted UI module is to be generated;
based on determining that a new formatted UI module is to be generated:
evaluating a second environment of a second application at the second client device based on a second plurality of formatting elements and content displayed by the second application;
determining a second format for the selected supplemental content based on the second selected formatting elements of the second plurality of formatting elements, the content displayed by the second application, and the selected supplemental content type;
adapting received module information and the selected supplemental content based on the determined second format;
generating, using the adapted received module information and the determined second format, a second formatted UI module comprising the selected supplemental content; and
providing the second formatted UI module for display in the second application at the second client device.

3. The system of claim 2, the adaptability operations further comprising:
receiving a third user request for second supplemental content, wherein the second supplemental content has a second associated type, from the first client device;
generating, using the module information and the first format, a third formatted UI module comprising third supplemental content; and
providing the third formatted UI module for display in the first application at the client device based on the second associated type.

4. The system of claim 2, wherein the application is different than the second application and comprises one or more of: a webpage, an email service, and a video-streaming service.

5. The system of claim 1, wherein the selected supplemental content type is based at least in part on a query searched by the application; and wherein the formatting elements relate to showing search results.

6. The system of claim 1, wherein the selected supplemental content comprises one or more of: visual content and textual content.

7. The system of claim 1, wherein the format is determined at least in part by using one or more of: an application lookup database and formatting elements received from the application.

8. The system of claim 1, wherein the module information is developer coded functionality.

9. The system of claim 1, further comprising computer-executable instructions that, when executed by the processor, cause the processor to:
embed the adaptive UI module in the application.

10. The system of claim 1, wherein the formatted UI module is displayed at the client device in one or more of the following ways: overlay, side panel, pop-up window, and window inlay expansion.

11. The system of claim 1, wherein the selected supplemental content type comprises shopping related content.

12. The system of claim 11, wherein the shopping content comprises one or more of the following types: products, categories, and retailers.

13. A method of providing supplemental content within web applications, comprising:
providing first content and second content for display in a web application;
generating a module request for module information;
receiving, in response to the module request, an adaptive user interface (UI) module from a module server, the adaptive UI module comprising the module information and selected supplemental content;
receiving an indication that a user selected a trigger for selected supplemental content associated with the first content;
evaluating an environment of an application at a client device based on a plurality of formatting elements and content displayed by the application;
determining a format for the selected supplemental content based on a type associated with the supplemental content and associated selected formatting elements of the plurality of formatting elements;
adapting the received module information and the selected supplemental content based on the determined format;
generating, a formatted UI module comprising the adapted selected supplemental content, wherein the formatted UI module is synchronous with the plurality of formatting elements, wherein the supplemental content is updated based on the user selection from within a currently displayed supplemental content; and providing for display, the formatted UI module, such that the selected supplemental content is displayed between the first content and the second content.

14. The method of claim 13, further comprising:
receiving a second user request for second supplemental content having a second associated type;
generating, using the adaptive UI module, a second formatted UI module comprising the second supplemental content based in part on the second associated type; and
providing for display the second formatted UI module.

15. The method of claim 13, wherein the display of the selected supplemental content comprises one or more of: visual content and textual content.

16. The method of claim 13, wherein the module information is developer coded functionality.

17. A method comprising:
receiving a web application from an application server, wherein the web application comprises content, a trigger for supplemental content, and an adaptive user interface (UI) module embedded in the content;
providing for display the web application;
receiving an indication that a user has selected the trigger for supplemental content associated with the content, the supplemental content having a predetermined type;
sending web application environment information to the application server, the web application environment information including a plurality of formatting elements and content displayed by the application;
receiving a formatted UI module and adapted supplemental content, wherein the formatted UI module is synchronous with the plurality of formatting elements and the adapted supplemental content is based on selected formatting elements of the plurality of formatting elements, the content, and selected supplemental content, wherein the supplemental content is updated based on the user selection from within a currently displayed supplemental content; and
providing for display the formatted UI module with the selected supplemental content, wherein the formatted UI module is displayed within the web application.

18. The method of claim 17 further comprising:
providing for display the formatted UI module in one or more of the following ways: overlay, side panel, pop-up window, and window inlay expansion.

19. The method of claim 17 wherein the environment information comprises one or more of: space, dimensions, surrounding content, surrounding context, latency requirements, freshness of data, or surrounding UI features.

20. The system of claim 1, wherein the adaptability operations further comprise:
receiving a second user request for the selected supplemental content from a second client device;
determining if a new formatted UI module is to be generated;
if a new formatted UI module is determined to be generated:
evaluate a second environment of a second application at the second client device based on a second plurality of formatting elements and content displayed by the second application,
determine a second format for the selected supplemental content based on second selected formatting elements of the second plurality of formatting elements, the content displayed by the second application, and the selected supplemental content type,
adapt received module information and the selected supplemental content based on the determined second format,
generate, using the adapted received module information and the determined second format, a second formatted UI module comprising the selected supplemental content, and
provide the second formatted UI module for display in the second application at the second client device; and
if a new formatted UI module is determined not to be generated:
provide the formatted UI module for display within an application UI of the second application at the second client device.

* * * * *